United States Patent
Kavas

(10) Patent No.: US 11,093,489 B2
(45) Date of Patent: *Aug. 17, 2021

(54) ANALYTIC SYSTEMS, METHODS, AND COMPUTER-READABLE MEDIA FOR STRUCTURED, SEMI-STRUCTURED, AND UNSTRUCTURED DOCUMENTS

(71) Applicant: Ephesoft Inc., Irvine, CA (US)

(72) Inventor: Ilker Kavas, Newport Beach, CA (US)

(73) Assignee: Ephesoft Inc., Irvine, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/241,604

(22) Filed: Jan. 7, 2019

(65) Prior Publication Data

US 2019/0138519 A1     May 9, 2019

Related U.S. Application Data

(63) Continuation of application No. 15/194,967, filed on Jun. 28, 2016, now Pat. No. 10,176,266, which is a (Continued)

(51) Int. Cl.

| | |
|---|---|
| *G06F 7/02* | (2006.01) |
| *G06F 16/00* | (2019.01) |
| *G06F 16/245* | (2019.01) |
| *G06F 16/9535* | (2019.01) |
| *G06F 16/93* | (2019.01) |

(Continued)

(52) U.S. Cl.
CPC ........ *G06F 16/245* (2019.01); *G06F 16/2428* (2019.01); *G06F 16/24569* (2019.01); *G06F 16/313* (2019.01); *G06F 16/93* (2019.01); *G06F 16/9535* (2019.01); *G06K 9/00449* (2013.01); *G06K 9/18* (2013.01)

(58) Field of Classification Search
CPC .. G06F 16/245; G06F 16/24569; G06F 16/93; G06F 16/2428; G06F 16/313; G06F 16/9535; G06F 9/00449; G06K 9/18
See application file for complete search history.

(56) References Cited

U.S. PATENT DOCUMENTS

| | | |
|---|---|---|
| 6,041,323 A | 3/2000 | Kubota |
| 6,081,774 A | 6/2000 | de Hita et al. |

(Continued)

OTHER PUBLICATIONS

European Office Action dated Jan. 10, 2019 for EP Application No. 16202642.1.

(Continued)

*Primary Examiner* — Bruce M Moser
(74) *Attorney, Agent, or Firm* — Knobbe, Martens, Olson & Bear, LLP

(57) ABSTRACT

A computer system extracts contender values as positively associated with a pre-defined value from a compilation of one or more electronically stored semi-structured document(s) and/or one or more electronically stored unstructured document(s). The computer system performs a multi-dimensional analysis to narrow the universe of contender values from all words on a page of the compilation to the contender value(s) with the highest likelihood of being associated with the pre-defined value. The system's platform allows every user of the system to customize the system according to the user's needs. Various aspects can enable users to mine document stores for information that can be charted, graphed, studied, and compared to help make better decisions.

18 Claims, 20 Drawing Sheets

Related U.S. Application Data continuation of application No. 14/960,871, filed on Dec. 7, 2015, now Pat. No. 9,384,264.

(51) Int. Cl.
*G06F 16/31* (2019.01)
*G06K 9/00* (2006.01)
*G06F 16/242* (2019.01)
*G06K 9/18* (2006.01)

(56) References Cited

U.S. PATENT DOCUMENTS

| | | |
|---|---|---|
| 6,105,022 A | 8/2000 | Takahashi et al. |
| 8,463,774 B1 | 6/2013 | Buron et al. |
| 8,880,540 B1 | 11/2014 | Sampson et al. |
| 9,384,264 B1 | 7/2016 | Kavas |
| 2007/0041642 A1 | 2/2007 | Romanoff et al. |
| 2007/0206884 A1 | 9/2007 | Kato |
| 2012/0278336 A1 | 11/2012 | Malik et al. |
| 2014/0089302 A1 | 3/2014 | Lapir |
| 2014/0369602 A1 | 12/2014 | Meier et al. |
| 2017/0161390 A1 | 6/2017 | Kavas |
| 2018/0253501 A1 | 9/2018 | Kavas |

OTHER PUBLICATIONS

U.S. Appl. No. 15/194,964, filed Jun. 28, 2016, Kavas.
U.S. Appl. No. 15/971,480, filed May 4, 2018, Kavas.
EP Search Report dated Feb. 27, 2017 for EP Application No. 16202642.1.

Ephesoft, Inc.

23041 Avenida De La Carlota #100
Laguna Hills, CA 92653
Phone: +1-
Fax: +1-86    ZIP
Email: info@ephesoft.com

ANALYTIC SYSTEMS, METHODS, AND COMPUTER-READABLE MEDIA FOR STRUCTURED, SEMI-STRUCTURED, AND UNSTRUCTURED DOCUMENTS

RELATED APPLICATIONS

This is a continuation of U.S. patent application Ser. No. 15/194,967, filed Jun. 28, 2016, which is a continuation of U.S. patent application Ser. No. 14/960,871, filed Dec. 7, 2015, issued as U.S. Pat. No. 9,384,264 on Jul. 5, 2016, the entire contents of each of which are incorporated by reference in their entirety.

FIELD

This disclosure relates to systems and techniques for extracting, accessing, manipulating, and/or displaying data from structured, semi-structured, and unstructured documents.

BACKGROUND

"Big Data" and the analytics market are expected to reach $125 billion worldwide in 2015. Eighty percent of enterprises and sixty three percent of small and medium business already have deployed or are planning to deploy Big Data projects in the near future. But the vast majority of these projects are based around structured data. It is estimated that eighty percent of an organization's data is unstructured or only semi-structured, however. And a significant portion of that unstructured and semi-structured data is documents. Today, just because organizations are applying analytics tools around their structured data, does not mean their unstructured and semi-structured documents have gone away. They have been, and will continue to be, an important aspect of an organization's data.

Semi-structured and unstructured documents are often voluminous. Such documents can consist of hundreds of individual papers. For example, a purchaser's mortgage document can be stored as a single 500-page document, which consists of individual papers such as the purchaser's income tax return(s), W-2(s), and credit report, the appraiser's report, and so forth, bundled together in the mortgage document. Each purchaser is associated with a different mortgage document. Thus, the size and volume of documents can be very large. Documents may be stored across various storage systems and/or devices and accessed by multiple departments and individuals. Documents may include different types of information and have various formats. They are used in many applications including mortgages and lending, healthcare, land environmental, and so forth, and they are fed by multiple sources like social networks, server logs, and information from banking transactions, web content, GPS trails, financial market data, etc.

SUMMARY

The systems, methods, and devices described herein each have several aspects, no single one of which is solely responsible for its desirable attributes. Without limiting the scope of this disclosure, several non-limiting features will now be discussed briefly.

In at least one embodiment, a computer system to extract contender values from a compilation of one or more electronically stored documents as positively associated with a pre-defined value is disclosed. The system can comprise one, some, or all of the following characteristics, as well as any characteristic described elsewhere in this disclosure.

The computer system can comprise one or more computer readable storage devices. The one or more computer readable storage devices can be configured to store one or more software modules including computer executable instructions. The one or more computer readable storage devices can be configured to stored the compilation. The electronically stored documents can comprise one or more semi-structured document(s) and/or one or more unstructured document(s) and each of the one or more electronically stored documents can comprise one or more pages. The computer system can comprise a network configured to distribute information to a user workstation.

The computer system can comprise one or more hardware computer processors in communication with the one or more computer readable storage devices.

The one or more hardware computer processors can be configured to execute the one or more software modules in order to cause the computer system to access, from the one or more computer readable storage devices, the compilation. The one or more hardware computer processors can be configured to execute the one or more software modules in order to cause the computer system to receive information regarding the pre-defined value. The pre-defined value can have a certain format, a certain two-dimensional spatial relationship to words in a pre-selected page, and/or be associated with one or more keywords. The one or more hardware computer processors can be configured to execute the one or more software modules in order to cause the computer system to, for each page of the compilation, identify words and contender values on the subject page using optical character recognition (OCR) and post-OCR processing. The one or more hardware computer processors can be configured to execute the one or more software modules in order to cause the computer system to group the identified words and the identified contender values into anchor blocks based on their spatial positioning on the subject page, such that the subject page comprises a plurality of anchor blocks and each anchor block comprises one or more words, one contender value, or a combination thereof.

The one or more hardware computer processors can be configured to execute the one or more software modules in order to cause the computer system to on the subject page, for each of the contender values, numerically determine a first confidence that the subject contender value is associated with the pre-defined value based at least in part on a comparison of a calculated two-dimensional spatial relationship between the subject contender value and the anchor blocks on the subject page with the pre-defined two-dimensional spatial relationship between the pre-defined value to the words in the pre-selected page.

The one or more hardware computer processors can be configured to execute the one or more software modules in order to cause the computer system to numerically determine a second confidence that the subject contender value is associated with the pre-defined value based at least in part on a comparison of words in the anchor blocks on the subject page with the one or more keywords associated with the pre-defined value. The one or more hardware computer processors can be configured to execute the one or more software modules in order to cause the computer system to numerically determine at least one additional confidence that the subject contender value is associated with the pre-defined value based at least in part on a comparison of a format of the contender value with the certain format of the pre-defined value.

The one or more hardware computer processors can be configured to execute the one or more software modules in order to cause the computer system to over all the pages of the compilation, extract positive contender values as positively associated with the pre-defined value based at least in part on the first confidence, the second confidence, and the least one additional confidence.

The one or more hardware computer processors can be configured to execute the one or more software modules in order to cause the computer system to store the positive contender values in the one or more computer readable storage devices. The one or more hardware computer processors can be configured to execute the one or more software modules in order to cause the computer system to transmit the positive contender values over the network to the user workstation in response to a search for values associated with the pre-defined value at the user workstation.

Any embodiment of the above-summarized system can also comprise one, some, or all of the following characteristics, as well as any characteristics described elsewhere in this disclosure.

Identifying the words and the contender values on the subject page can comprise identifying each word on the subject page. Identifying the words and the contender values on the subject page can comprise identifying each contender value on the subject page. The one or more hardware computer processors can be configured to execute the one or more software modules in order to cause the computer system to, for each of the anchor blocks comprising a contender value, assign a first anchor block weight to all words in the subject anchor block, assign a second anchor block weight to all words in a second anchor block above and immediately adjacent to the subject anchor block such that there are no anchor blocks between the second anchor block and the subject anchor block in the vertical direction, assign a third anchor block weight to all words in a third anchor block to the left of and immediately adjacent to the subject anchor block such that there are no anchor blocks between the third anchor block and the subject anchor block in the horizontal direction, and assign various other anchor block weights, lower than the first anchor block weight, the second anchor block weight, and the third anchor block weight, to remaining anchor blocks, each based on a respective two-dimensional spatial distance to the subject anchor block. Assigning the various other anchor block weights to the remaining anchor blocks can comprise assigning lower anchor block weights to anchor blocks located to the right of the value block than anchor blocks located an equivalent two-dimensional spatial distance to the left of the value block.

The determination of the first confidence can be adjusted based on the number of anchor blocks on the subject page. Numerically determining the at least one additional confidence that the subject contender value is associated with the pre-defined value can be based at least in part on a compensation for typographical differences between words in the anchor blocks on the subject page and the words in the pre-selected page not exceeding a numerical threshold. Numerically determining the at least one additional confidence that the subject contender value is associated with the pre-defined value can be based at least in part on a compensation for root-stem associations between words in the anchor blocks on the subject page and the words in the pre-selected page. Numerically determining the at least one additional confidence that the subject contender value is associated with the pre-defined value can be based at least in part on relative positions of words in the anchor blocks.

Grouping the identified words and the identified contender values into anchor blocks can be further based on typographical characteristics of the identified words and identified contender values. The typographical characteristics can comprise font size and/or font face. Numerically determining the at least one additional confidence that the subject contender value is associated with the pre-defined value can be based at least in part on a compensation for typographical differences between the subject contender value and the pre-defined value not exceeding a numerical threshold.

The post-OCR processing can be configured to identify a contender value based on formatting including one or more of numerical formatting, date formatting, and delimiting character formatting. The format of the pre-defined value can comprise a location of the pre-defined value in a zone on the pre-selected page, and numerically determining the at least one additional confidence that the subject contender value is associated with the pre-defined value can be based at least in part on a location of the subject contender value being in the zone. Numerically determining the at least one additional confidence that the subject contender value is associated with the pre-defined value can be based at least in part on a page number of the compilation. The electronically stored documents can further comprise one or more structured document(s). Numerically determining the at least one additional confidence that the subject contender value is associated with the pre-defined value can be based at least in part on the subject contender value's position in a pre-defined location on the subject page.

When the pre-defined value is a ZIP code, numerically determining the at least one additional confidence that the subject contender value is associated with the pre-defined value can be based at least in part on an evaluation of a position of the subject contender value within its associated anchor block. When the pre-defined value is a ZIP code, the one or more computer readable storage devices can be configured to store valid ZIP codes and numerically determining the at least one additional confidence that the subject contender value is associated with the pre-defined value can be based at least in part on a comparison of the subject contender value to the valid ZIP codes. When the pre-defined value is an address or a portion thereof, the system can further comprise a network connection configured to access a geolocation library, and numerically determining the at least one additional confidence that the subject contender value is associated with the pre-defined value can be based at least in part on a validation of the subject contender value against the geolocation library.

The first confidence can be associated with a first dimension, the second confidence can be associated with a second dimension, and the least one additional confidence can be associated with at least one additional dimension. The one or more hardware computer processors can be configured to execute the one or more software modules in order to cause the computer system to adjust a distinct weight assigned to each of the first dimension, the second dimension, and the at least one additional dimension based on the pre-determined value when extracting positive contender values as positively associated with the pre-defined value.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 14 illustrates an example extractor testing user interface screen according to at least one embodiment.

FIGS. 15-19 illustrate example analytics user interface screens according to various embodiments.

Figures 1, 2:
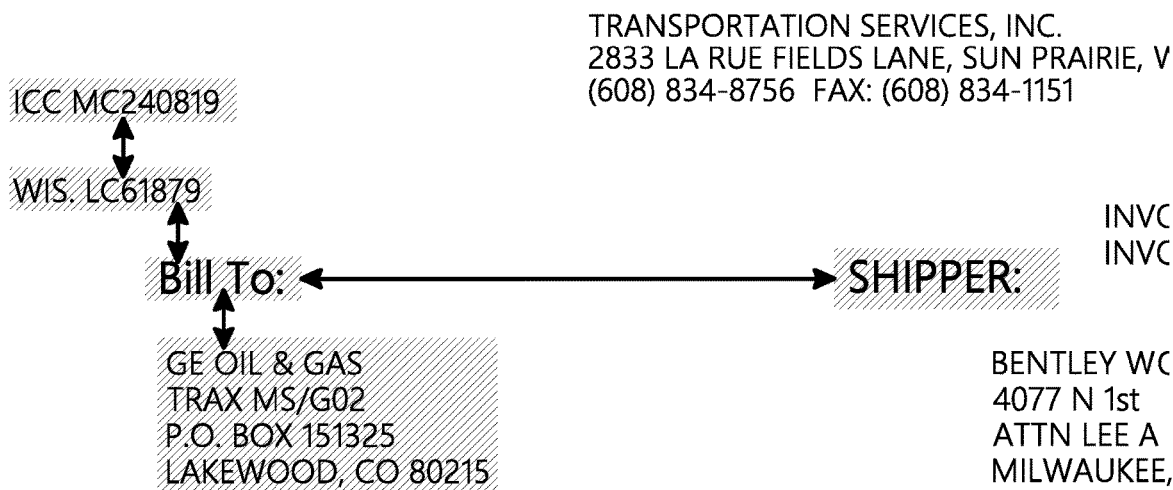
FIG. 1 illustrates example blocks appearing on a page of a document, according to at least one embodiment.
FIG. 2 illustrates text blocks connected to each other forming a graph, according to at least one embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

A "document" refers to an electronically stored paper or other written item furnishing information and includes, without limitation, electronically stored books, articles, letters, passports, deeds, bills of sale, bills of lading, forms, and any other documents referred to herein.

"Structured documents" are documents in which information is uniformly positioned in the same location. An example of a structured document is the Internal Revenue Service Form W-2. Employees in the United States fill out the same Form W-2, which includes information types such as social security number (SSN), name, and wages, in the same location.

"Semi-structured documents" may have similar information on them, but the information is not necessarily positioned in the same location for all variations. Examples of semi-structured documents are invoices. Most companies create invoices, and these invoices tend to include similar information, such as invoice amount, invoice date, part numbers, shipping date, etc. But this information is not positioned in the same location across the many vendors or companies that create invoices.

"Unstructured documents" are documents that do not include similar information as other documents and the information is not positioned in a particular location. An example of an unstructured document is the message body of an email, a blog post, or a TWEET® communication (Twitter, Inc., San Francisco, Calif.). The message body of an email may have information about opening an accident claim with an insurance company. Other emails and letters relating to this claim may contain information such as name, account number, address, and accident date, but no document will look like any other document.

A "pre-defined value" is a value of interest.

A "contender value" is a value that can possibly be associated with a pre-defined value. Before the system makes a decision whether a contender value is positively associated with a pre-defined value, the system will evaluate the contender value across many dimensions. At the beginning, each word on a page document is a contender value. After going through each dimension, the contender values will be upgraded to values of interest and the contender with highest score will be deemed as positively associated with the pre-defined values. For example, when evaluating the textual string "Ephesoft agrees to pay $1,000 for taxes and $200 for interest on Jan. 1, 2015," the system may be instructed to locate information positively associated with "tax amount." The system will consider all 15 words as contender values. When the software is evaluating amounts, the formatting dimension will reduce the contender values into two ($1000 and $200). Other dimensions like keyword dimensions will finally decide $1,000 is the best choice for tax amount.

A "block" is a textual grouping of one or more words and may include a contender value or a pre-defined value.

An "anchor block" is a block that includes or appears spatially near a specific contender value or a specific pre-defined value on a page of a document.

A "compilation" is a collection of one or more electronically stored documents.

A "confidence" is a numerical likelihood that a contender value is positively associated with a pre-defined value.

A "field type" represents the data type for a particular value.

A "keyword" is a word assigned by a user as associated with a pre-defined value.

A "page" is an electronically stored sheet in a compilation.

A "pre-selected page" is a page of interest.

A "weight" is a number assigned to a data item that reflects its relative importance.

A "word" is a single distinct meaningful element on a page typically shown with a space and/or punctuation element(s) on either side.

Technological Improvements

Various embodiments of the present disclosure provide improvements to various technologies and technological fields. For example, various aspects can enable users to mine document stores for information that can be charted, graphed, studied, and compared to help make better decisions. These could be financial documents, patient records, contracts, HR records, or other types of documents typically stored in an enterprise content management system, a large file store, and the like. In another aspect, the improvements can be deployed such that the system does not require information technology and specialized document management experts to run it. It should be understood that the invention can be embodied or carried out in a manner that achieves or optimizes one advantage or group of advantages as taught herein without necessarily achieving other advantages as can be taught or suggested herein.

Various embodiments of the present disclosure discuss recently arisen technological problems and solutions inextricably tied to those technologies. For example, some parts of the specification disclose technology that allows for identification of specific data in huge electronic repositories of unstructured or semi-structured documents, a recently arisen technological problem. Such a usage of electronic documents is not possible in a system without computer technology, and therefore is inextricably tied to at least specialized systems featuring electronic document storage. In addition, certain embodiments address the realization that modern computing is both a blessing and a curse. It has reduced the need to store and maintain paper records. But modern computers have saddled entities with a serious problem. Entities can now cheaply store electronic data in an infinitesimal fraction of the space required for equivalent paper records. And now that entities can easily store vast amounts of electronic data, they do—often without regard for what to do with those overwhelming data stores later. The analysts tasked with reviewing such large pluralities of data cannot keep up with the influx, and time-sensitive information can remain undetected until it is too late to do anything. Simply, put, modern computing created a problem and various embodiments address this computer-centric problem of processing haystacks of electronic transaction data, allowing analysts to quickly find needles in those haystacks. In other words, such embodiments solve a computer-centric problem with a solution that is necessarily rooted in computer technology.

Parts of the specification disclose how to implement specific technological solutions that are otherwise difficult to implement on a computer. Some parts of the specification discuss computer-implementable solutions to non-mathematical problems such as determining "Is this the data I am looking for?"

Parts of the specification disclose improvements to existing technological solutions. For example, some embodiments implement document analysis systems that are far faster to set up or required less manual input than prior solutions. As another example, some embodiments feature improved data location accuracy over previous solutions.

Parts of the specification disclose the use of computer systems to solve problems that cannot be inherently solved by humans alone. The disclosed system can constantly learn from the human feedback. As a starting point, initial algorithm parameters dictate how each dimension should be evaluated and weighted by the system. For example, when the system is looking for a field, the parameters might be initially programmed such that certain keywords might be more important than on which page the field located. Multiple users interact with the disclosed system, and the system will learn from their feedback and automatically adjust the dimensions and their weights and importance. Such processing on every field, on every document, and for every user interacting with the system is not something a human can do. For example, in American mortgage documents, there are about 450 document types, and each document types can have somewhere between 10 fields to 1000 fields. If we have 500 users, the system can fine tune the extraction for 2.25 billion things to track per feedback. No human can do this.

DESCRIPTION OF THE DRAWINGS

A computer system to positively associate a pre-defined value with contender values from a compilation of one or more electronically stored documents is disclosed herein. The system can include one or more computer readable storage devices. The one or more computer readable storage devices can be configured to store one or more software modules including computer executable instructions. The one or more computer readable storage devices also can be configured to store the compilation. It was inventively realized that the disclosed system is particularly desirable for processing semi-structured documents and unstructured documents, in which important data may not be included in an expected location on a page or in which the placement of important data may be seemingly arbitrary. Accordingly, in certain embodiments, the electronically stored documents can comprise one or more semi-structured document(s) and/or one or more unstructured document(s). It should be understood, however, that processing of structured documents is not specifically excluded. In any event, each of the one or more electronically stored documents comprises one or more pages. As discussed below, the one or more electronically stored documents are advantageously processed page-by-page.

The computer system can also comprise a network configured to distribute information to a user workstation. The user workstation can be local to or remote from the computer system. Accordingly, the network can comprise internal wiring, a locally connected cable, or an external network such as the Internet.

The computer system can further include one or more hardware computer processors in communication with the one or more computer readable storage devices and configured to execute the one or more software modules in order to cause the computer system to perform various functions. For example, a function can be accessing the compilation from the one or more computer readable storage devices. Such computer readable storage devices can be incorporated in a variety of electronic devices, including mobile devices like tablets or smartphones, and computers like laptops, desktops, and servers.

Another function can be receiving information regarding the pre-defined value. For instance, the information can include information about the pre-defined value's format, any keywords associated with the pre-defined value, and/or the two-dimensional spatial relationship to words in a pre-selected page.

Yet another function can include, for each page of the compilation, identifying words and contender values on the subject page using optical character recognition (OCR) and post-OCR processing. A related function can include, for each page of the compilation, receiving an identification of words and contender values on the subject page determined using processes such as OCR and post-OCR processing. As used herein, OCR generally refers to electronic conversion of images of typed, handwritten, or printed text into machine-encoded text. Post-OCR processing generally refers to a process of identifying words in the machine-encoded text. Such post-OCR processing can include comparing strings of the machine-encoded text to a lexicon (a list of words that are allowed to occur in a document). Example lexicons include, for example, all the words in the English language, or a more technical lexicon for a specific field. Post-OCR processing can also include more sophisticated processing such as "near-neighbor analysis" that makes use of co-occurrence frequencies to correct errors, based on the realization that certain words are often seen together. For example, "Washington D.C." is generally far more common than "Washington DOC." Knowledge of the grammar of the language being processed can also help determine if a word is likely to be a verb or a noun, for example, allowing for even greater accuracy.

Still another function can include, over all the pages of the compilation, extracting positive contender values as positively associated with the pre-defined value based at least in part on numerical confidence values that certain contender values are associated with the pre-defined value.

Optionally, the system can store the positive contender values in the one or more computer readable storage devices and/or transmit the positive contender values over the network to the user workstation in response to a search for values associated with the pre-defined value at the user workstation. The processing to positively identify contender values does not necessary occur in response to any search for values. Rather, the processing can occur independent of any search and quickly return requested data on demand.

Additional functions are discussed below with reference to the figures.

1. Blocks 1.1 Block Generation

In at least one embodiment, the system is capable of identifying a block on a page of a document. That the system can process data as blocks, rather than solely individual words, is an important advance because it allows the system to process data having many possible formats. For example, an address can appear on a page on one line. On other pages, the address may be split across multiple lines. The system can recognize both as blocks, based on their spatial properties. For example, a multi-word block can be identified by identifying groups of words. A limit can be calculated for each line based on the spaces that are close to each other. Starting with a first word, a spatial distance to a second word and a third word can be calculated. The shortest distance is used to form blocks. Because font size may affect the space between words in each line, font size can also be factored when calculating the minimum space.

FIG. 1 illustrates an excerpt of a page of a document. Block 1 and Block 2 are generated by using white space as the parameter to determine block boundaries.

Blocks are used both for multi-word extraction and identifying anchor blocks near values. The pre-defined value under inquiry may contain more than one word. For example, address, name, title, and some dates correspond with multi-word pre-defined values that require multi-word extraction. Accordingly, contender values are not necessarily single words. The anchor blocks are used to give equal weightage to words in a phrase. For example, in an anchor block "Borrower's Name," both the words "Borrower's" and "Name" are equally important in identifying desired value.

Thus, in certain embodiments, the one or more hardware computer processors can be configured to execute the one or more software modules in order to cause the computer system to perform grouping the identified words and the identified contender values (from OCR and post-OCR processing) into anchor blocks based on their spatial positioning on the subject page, such that the subject page comprises a plurality of anchor blocks and each anchor block comprises one or more words, one contender value, or a combination thereof.

1.2 Graphs-Based Representation of Related Blocks

The blocks on a page can be interrelated by representing them as nodes of a connected graph. These nodes have a bidirectional relationship with each other. For example, FIG. 2 displays text blocks connected to each other forming a graph.

2. Dimensional Model for Extraction

In at least one embodiment, the system employs a multi-dimensional algorithm to extract data from documents. Each dimension is independently applied on pages and the results from each dimension are aggregated using a weighted-mean calculation. Desirable, the results from each dimension are represented by a numerical value in the range of 0.0 and 1.0. The final confidence score is associated with a contender value for a pre-defined value and the contender value with the highest confidence score is chosen as positively associated with the pre-defined value.

Each dimension has a certain weight, such as a numerical value in the range of 0.0 and 1.0, associated with it and this weight is multiplied with the result of applying a dimension while extracting contender values for a pre-defined value.

$$\text{final confidence} = \frac{\sum w_i c_i}{\sum w_i}$$

where
i ranges from 1 to the total number of dimensions,
$w_i$ represents the weight for dimension i, and
$c_i$ represents the confidence for dimension i.

Dimensions are divided into three broad categories: anchor dimensions, value dimensions, and use-case specific dimensions. The next sections discuss each category of dimensions in greater detail.

2.1 Anchor Block Dimensions

Anchor blocks can help positively identify candidate values as associated with pre-defined values, as both have relationships with their respective anchor blocks. The importance of an anchor block is a function of various dimensions.

2.1.1 Location

In certain embodiments, the one or more hardware computer processors can be configured to execute the one or more software modules in order to cause the computer system to numerically determine a first confidence that a contender value is associated with the pre-defined value based at least in part on a comparison of a calculated two-dimensional spatial relationship between the subject contender value and the anchor blocks on the subject page with the pre-defined two-dimensional spatial relationship between the pre-defined value to the words in the pre-selected page.

An anchor block's location relative to a contender value is an important property for quantifying the anchor block's relevance to the contender value. Certain embodiments contemplate at least two phases for determining and refining the weight and confidence values assigned to an anchor block with respect to a contender value: a training phase and a testing phase.

2.1.1.1 Training Phase

In the training phase, the two-dimensional spatial relationship between the pre-defined value and words in a pre-selected page is determined. During the training phase, a user provides a sample of (pre-defines) the pre-defined value. For example, a user can choose a particular value on a selected page of a mortgage or deed of trust as a sample of a mortgage information number (MIN).

Weights are then assigned to words in anchor blocks on the same page as the pre-defined value. The weights are assigned based on the location of that anchor block relative to pre-defined value. In at least one embodiment, all words in an anchor block are given same weight.

Figure 3:
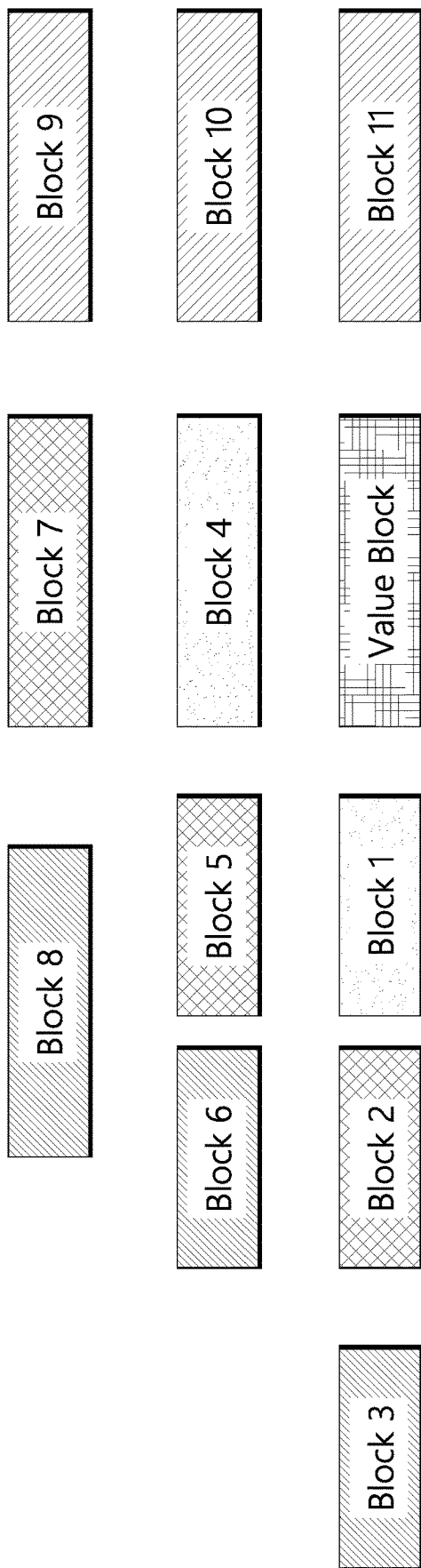
FIG. 3 illustrates spatial positioning and relative weighting of anchor blocks on a training page, according to at least one embodiment.

In FIG. 3, the value block represents the particular anchor block containing the pre-defined value. Words in the value block are assigned a high weight, such as 1.0. Block 1 and Block 4 are spatially close to the value block in the horizontal and vertical directions. Words in Block 1 and Block 4 are assigned a high weight, such as 1.0. Block 2, Block 5, and Block 7 are spatially close to the value block but farther from the value block than Block 1 and Block 4. Words in Block 2, Block 5, and Block 7 are assigned a moderately high weight, such as 0.8. Block 3, Block 6, and Block 8 are farther from the value block than Block 2, Block 5, and Block 7, and words in Block 3, Block 6, and Block 8 are assigned a lower weight than the words in Block 2, Block 5, and Block 7. In this example, the words in Block 3, Block 6, and Block 8 are assigned a weight such as 0.25. Block 9, Block 10, and Block 11 are spatially close to the value block in the horizontal and vertical directions. But it was inventively realized that, in language scripts read left-to-right, a block positioned to the left of a value block is more likely to be related to that value block than a block positioned to the right of a value block. Because Block 9, Block 10, and Block 11 are positioned to the right of the value block, they are assigned a lower weight than the blocks positioned directly above or to the left of the value block. In this example, Block 9, Block 10, and Block 11 are assigned a weight such as 0.125. It should be understood that the numerical weights discussed with reference to FIG. 3 are non-limiting examples. Other suitable numerical weights are within the scope of the invention.

For every pre-defined value, the system learns a set (Xs), as defined below.

$$X_s = \{(A_1 C_1), (A_2 C_2), (A_3 C_3), \ldots, (A_M C_M)\}$$

where

M represents the total number of anchor blocks for the set (s),
$A_1$ represents the first anchor block in the set (s),
$C_1$ represents the weight for the first anchor block ($A_1$),
$A_2$ represents the second anchor block in the set (s),
$C_2$ represents the weight for the second anchor block ($A_2$),
$A_3$ represents the third anchor block in the set (s),
$C_3$ represents the weight for the third anchor block ($A_3$),
$A_M$ represents the last anchor block in the set (s), and
$C_M$ represents the weight for the last anchor block ($A_M$).

2.1.1.2 Testing Phase

In the testing phase, the two-dimensional spatial relationship between a subject contender value and the anchor blocks on the subject page is determined. The system first identifies contender values on a page. For each contender value of a pre-defined value, the system identifies anchor blocks near that contender value in the same manner described above with respect to the training phase and prepares a set ($Y_i$) defined below.

$$Y_i = \{(A_1 C'_1), (A_2 C'_2), (A_3 C'_3), \ldots, (A_N C'_N)\}$$

where

N represents the total number of anchor blocks for this contender value (i),
$A_1$ represents the first anchor block near the contender value,
$C_1$ represents the weight for the first anchor block ($A_1$),
$A_2$ represents the second anchor block in the set (i),
$C_2$ represents the weight for the second anchor block ($A_2$),
$A_3$ represents the third anchor block in the set (i),
$C_3$ represents the weight for the third anchor block ($A_3$),
$A_N$ represents the last anchor block in the set (i), and
$C_N$ represents the weight for the last anchor block ($A_N$).

The system compares set $Y_i$ with training set Xs. In certain embodiments, all anchor blocks from the training phase that are missing in the testing phase are given zero weight. A final confidence score in the range of 0 to 1 is calculated as follows. First, based on the inventive realization that it is undesirable to give an unusually high score to values having few anchors, an anchor count threshold K is defined to divide the process. In certain embodiments, K is equal to 5.

When N≥K in the testing phase, anchor blocks identified in the testing phase will be weighed with the training phase considered that, when the training set increases, confidence should not be lowered to a great extent. Thus, $$\text{Confidence of value for index field} = \sum_{j=1}^{N} \frac{x_j}{N}$$

where $$x_j = \frac{\min(C_j, C'_j)}{\max(C_j, C'_j)}$$

$C_j$ represents the weight for the $j^{th}$ anchor block in the training phase, and
$C'_j$ represents the weight for the $j^{th}$ anchor block in the testing phase.

When N<K in the testing phase, $$\text{Confidence of value for index field} = \sum_{j=1}^{N} \frac{x_j}{\min\left(\left(N + \frac{1}{2}(K - N)\right), L\right)}$$

where $$x_j = \frac{\min(C_j, C'_j)}{\max(C_j, C'_j)}$$

$C_j$ represents the weight for the $j^{th}$ anchor block in the training phase,
$C'_j$ represents the weight for the $j^{th}$ anchor block in the testing phase, and
L represents the total anchor blocks learned in the training phase.

The foregoing algorithm provides an example method for numerically determining a first confidence that the subject contender value is associated with the pre-defined value based at least in part on a comparison of a calculated two-dimensional spatial relationship between the subject contender value and the anchor blocks on the subject page with the pre-defined two-dimensional spatial relationship between the pre-defined value to the words in the pre-selected page.

More specifically, in the method, the one or more hardware computer processors can be configured to execute the one or more software modules in order to cause the computer system to, for each of the anchor blocks comprising a contender value, assign a first anchor block weight to all words in the subject anchor block, assign a second anchor block weight to all words in a second anchor block above and immediately adjacent to the subject anchor block such that there are no anchor blocks between the second anchor block and the subject anchor block in the vertical direction, assign a third anchor block weight to all words in a third anchor block to the left of and immediately adjacent to the subject anchor block such that there are no anchor blocks between the third anchor block and the subject anchor block in the horizontal direction, and assign various other anchor block weights, lower than the first anchor block weight, the second anchor block weight, and the third anchor block weight, to remaining anchor blocks, each based on a respective two-dimensional spatial distance to the subject anchor block.

Assigning the various other anchor block weights to the remaining anchor blocks can comprise assigning lower anchor block weights to anchor blocks located to the right of the value block than anchor blocks located an equivalent two-dimensional spatial distance to the left of the value block.

2.1.2 Anchor Imprecision

Certain embodiments include the inventive realization that there may be some words in anchor blocks which are misread during OCR and hence certain characters may not match from the training and evaluation phases. As explained above, in certain embodiments, all anchor blocks from the training phase that are missing in the testing phase are given zero weight. To avoid the potentially undesirable result that an anchor block is given zero weight during the testing phase solely because of a misreading during OCR, the system can allow for imprecision in the matching of anchors.

Thus, the system can compensate for typographical differences between words in the anchor blocks on the subject page and the words in the pre-selected page not exceeding a numerical threshold. For example, the system may recognize words as a match when they have greater than or equal to 70% of the same characters.

2.1.3 Root-Stem

Root-stems of words in anchor blocks were discovered to decrease highly coupled dependence on exact word matching during the training and evaluation phases. As used herein, the term "root-stem" refers to a part of a word to which affixes can be attached. The root-stem is common to all inflected variants. Consider, for example, "Borrower Name," "Name of Borrower," "Borrowing Party," and "Borrower." Borrow is the root-stem word for "Borrower" and "Borrowing" in each of these phrases. As explained above, in certain embodiments, all anchor blocks from the training phrase that are missing in the testing phase are given zero weight. To avoid the potentially undesirable results that an anchor block is given zero weight during the testing phase solely because two phrases use different variants of the same root-stem, the system can incorporate root-stem matching while looking for words in anchor blocks near contender values and pre-defined values.

Thus, in certain embodiments, a numerical confidence can be based at least in part on a compensation for root-stem associations between words in the anchor blocks on the subject page and the words in the pre-selected page.

2.1.4 Relative Position of Words

The relative position of a word in an anchor block can be given importance. The position of each word as compared to other words is learned during the training phase and this knowledge is applied during the evaluation phase. For example, for the anchor block "Borrowing Name" the system learns that the word "Borrowing" appears before "Name."

Thus, in certain embodiments, a numerical confidence can be based at least in part on relative positions of words in the anchor blocks.

2.1.5 Anchor Quantization

Generally the words in anchor blocks in a document follow the same convention in terms of font size, font face, and other characteristics. Hence, this information can be used to separate anchors from contender values automatically. This feature can remove or lessen the need to train empty documents to identify words in anchor blocks versus empty spaces that will eventually be filled by values.

Thus, in certain embodiments, grouping the identified words and the identified contender values into anchor blocks is further based on typographical characteristics of the identified words and identified contender values, the typographical characteristics comprising font size and/or font face.

2.1.6 Pre-Determined Value Keywords

It was inventively realized that name words or other keywords associated with a pre-determined value during the training phase can be highly correlated to the words in anchor blocks around a contender value likely associated with the pre-determined value. For example, a pre-determined value "123-45-6789" can be assigned a keyword "SSN" during the training phase. Words in anchor blocks associated with that pre-determined value may be "Borrower," "Social," "Security," and "Number." During the testing phase, while evaluating a contender value, the system encounters the words "Borrower" and "SSN" in associated anchor blocks. In this example, the word "SSN" is recognized from the pre-defined value keyword defined during the training phase and therefore the system is able to give more confidence to this contender value as associated with the pre-defined value.

Thus, in certain embodiments, a numerical confidence that the subject contender value is associated with the pre-defined value can be based at least in part on a comparison of words in the anchor blocks on the subject page with the one or more keywords associated with the pre-defined value.

2.2 Value Dimensions

Contender values can also be evaluated along with their properties to generate confidence values.

2.2.1 Value Imprecision

A contender value may not exactly match the format of the pre-defined value due to errors during OCR. For example, the format of the pre-defined value may include, for example, an "Integer" field type designation. The actual value of a contender value being evaluated is "69010." Due to an error during OCR, the recorded value of that contender value is "690J0." It would be undesirable to ignore or give little weight to the recorded value because of the error and advantageous to consider the recorded value despite the type mismatch due to the imprecision factor being within limits.

Thus, in certain embodiments, a numerical confidence can be based at least in part on a compensation for typographical differences between the subject contender value and the pre-defined value not exceeding a numerical threshold. For example, the system may recognize a contender value when it has greater than or equal to 70% format match.

2.2.2 Type Hierarchy

Figures 4, 5:
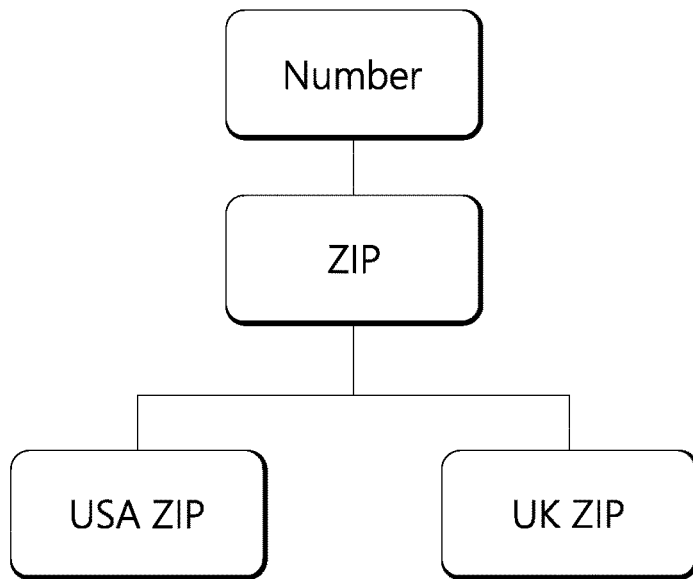
FIG. 4 illustrates a graphical hierarchy of a field type, according to at least one embodiment.
FIG. 5 illustrates placement of a ZIP code in an anchor block representing an address.

A hierarchy of a field type of the pre-determined value can be learned during the training phase. For example, a field type "USA ZIP" can be part of an example hierarchy, as shown in FIG. 4. If the pre-determined value is associated with the field type "USA ZIP" during training, and the contender value under consideration is not USA ZIP, but a UK ZIP, lesser confidence is given to that contender value. Conversely, if the hierarchies of field types of the pre-determined value and a subject contender value match exactly, then more confidence that the subject contender values is positively associated with the pre-determined value is given.

In general, however, a numerical confidence that the subject contender value is associated with the pre-defined value can be based at least in part on a comparison of a format of the contender value with the certain format of the pre-defined value.

2.2.3 Value Quantization

It was discovered that similar contender values in a document tend to follow the same convention in terms of font size, font face, and other characteristics. Certain words which are of specific type such as numbers (whole, 69010, or character delimited, 123-45-6789), dates (01/12/2001), and so forth are likely to be contender values. The properties of these words can be used to identify the pattern being followed by most other values on a page.

Thus, in certain embodiments, the post-OCR processing is configured to identify a contender value based on formatting including one or more of numerical formatting, date formatting, and delimiting character formatting.

2.2.4 Page Zone

This dimension takes into consideration the zone inside a page in which a subject contender value and a pre-defined value appears.

TABLE 1

Page Zones

| | | |
|---|---|---|
| Top Left | Top Center | Top Right |
| Middle Left | Middle Center | Middle Right |
| Bottom Left | Bottom Center | Bottom Right |

If, during the testing phase, a contender value appears in the same zone that the pre-defined value appeared in during the training phase, a higher confidence can be given to the subject contender value that when a contender value appears in a different zone. The page is divided into the following nine zones.

Thus, in certain embodiments, the format of the pre-defined value can comprise a location of the pre-defined value in a zone on the pre-selected page, and a numerical confidence that a subject contender value is associated with the pre-defined value can be at least in part on a location of the subject contender value being in the zone.

2.2.5 Page Number

Page number also can be taken into consideration while assessing contender values. If a contender value appears on the same page number within a document that the pre-defined value appeared on during the training phase, the contender value can be given higher confidence in this dimension.

Thus, in certain embodiments, a numerical confidence that the subject contender value is associated with the pre-defined value can be based at least in part on a page number of the compilation.

2.2.6 Fixed Value Location

For documents with fixed text block areas for values, the system can learn the exact co-ordinates of rectangular areas during training. This feature is particularly useful for structured documents where data of interested repeatably appears at a certain location. The words appearing inside the defined area will be preferred over rest of the words in the document.

Thus, in certain embodiments, the electronically stored documents can further comprise one or more structured document(s) and a numerical confidence that the subject contender value is associated with the pre-defined value can be based at least in part on the subject contender value's position in pre-defined location.

2.3 Use-Case Specific Dimensions

The following three dimensions are use-case specific and solve a niche area of extraction: ZIP code location, ZIP code dictionary, and geo-location.

2.3.1 ZIP Code Location

This dimension is particularly useful for extracting ZIP codes from within a block comprising an address. It was realized that a ZIP code ordinarily appears after a city and a state in an address. Based on this realization, the system can use the information that the ZIP code should appear after the city and state inside an address to assign relevant weights and/or confidence for a contender value. For example, in FIG. 5, the system would give more weight to the actual ZIP code "92653" than the street address "23041" using the fact that former is at the expected place inside the address.

Thus, in certain embodiments, when the pre-defined value is a ZIP code, a numerical confidence the subject contender value is associated with the pre-defined value can be based at least in part on an evaluation of a position of the subject contender value within its associated anchor block.

2.3.1 ZIP Code Dictionary

This dimension is also particularly useful for extracting ZIP codes. Embodiments comprising this dimension can incorporate a locally or remotely stored dictionary of all valid ZIP codes in a country specific manner. For example, only the five digit numbers that are valid US ZIP codes as per the dictionary will be considered for this dimension.

Thus, in certain embodiments, when the pre-defined value is a ZIP code, a numerical confidence that the subject contender value is associated with the pre-defined value is based at least in part on a comparison of the subject contender value to valid ZIP codes.

2.3.1 Geo-Location

The fields related to location like addresses and ZIP code can be validated against one or more local or remotely stored geolocation libraries. This would serve as yet another dimension supporting a conclusion a subject contender value is positively associated with a pre-defined value.

Thus, in certain embodiments, when the pre-defined value is an address or a portion thereof, the system can further comprise a network connection configured to access a geolocation library. A numerical confidence that the subject contender value is associated with the pre-defined value can be based at least in part on a validation of the subject contender value against the geolocation library.

2.4 Additional Comments on Dimensions

The system will compute at least one, more advantageously several, and in some embodiments all, of the foregoing dimensions to conclude whether a contender value should be positively identified as associated with the pre-defined value itself. Furthermore, as discussed herein, the system is also able to adjust which dimension has more weighting and which has less based on the samples (pre-determined values) users provide. Thus, each confidence can be associated with a distinct dimension (and vice versa), and each dimension can be associated with a distinct weight. The system can adjust the weight assigned to each dimension based on the pre-determined value when extracting positive contender values as positively associated with the pre-defined value.

Example Implementation Mechanisms

Figure 6:
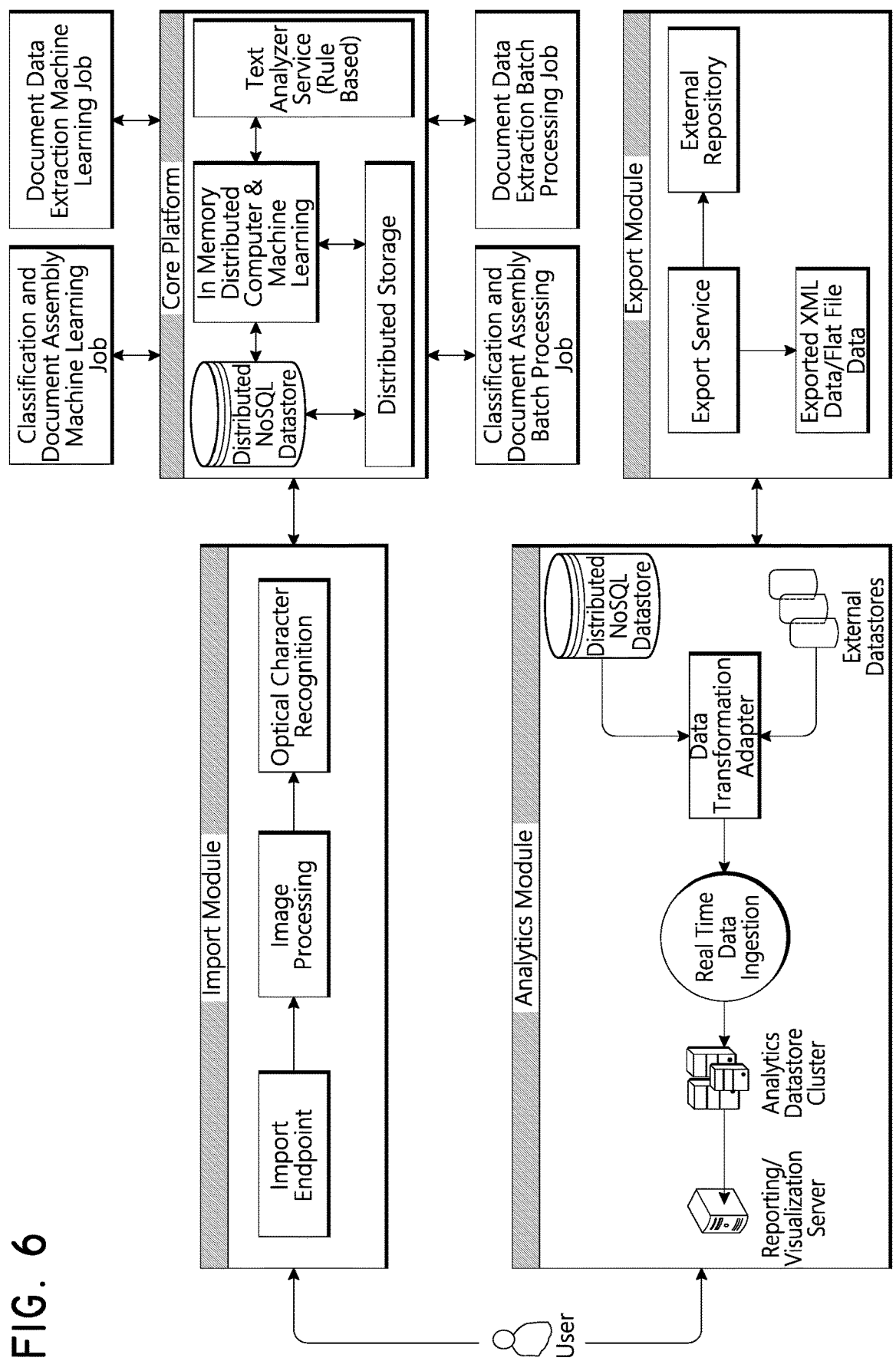
FIG. 6 illustrates an example system architecture according to at least one embodiment.
Figure 7:
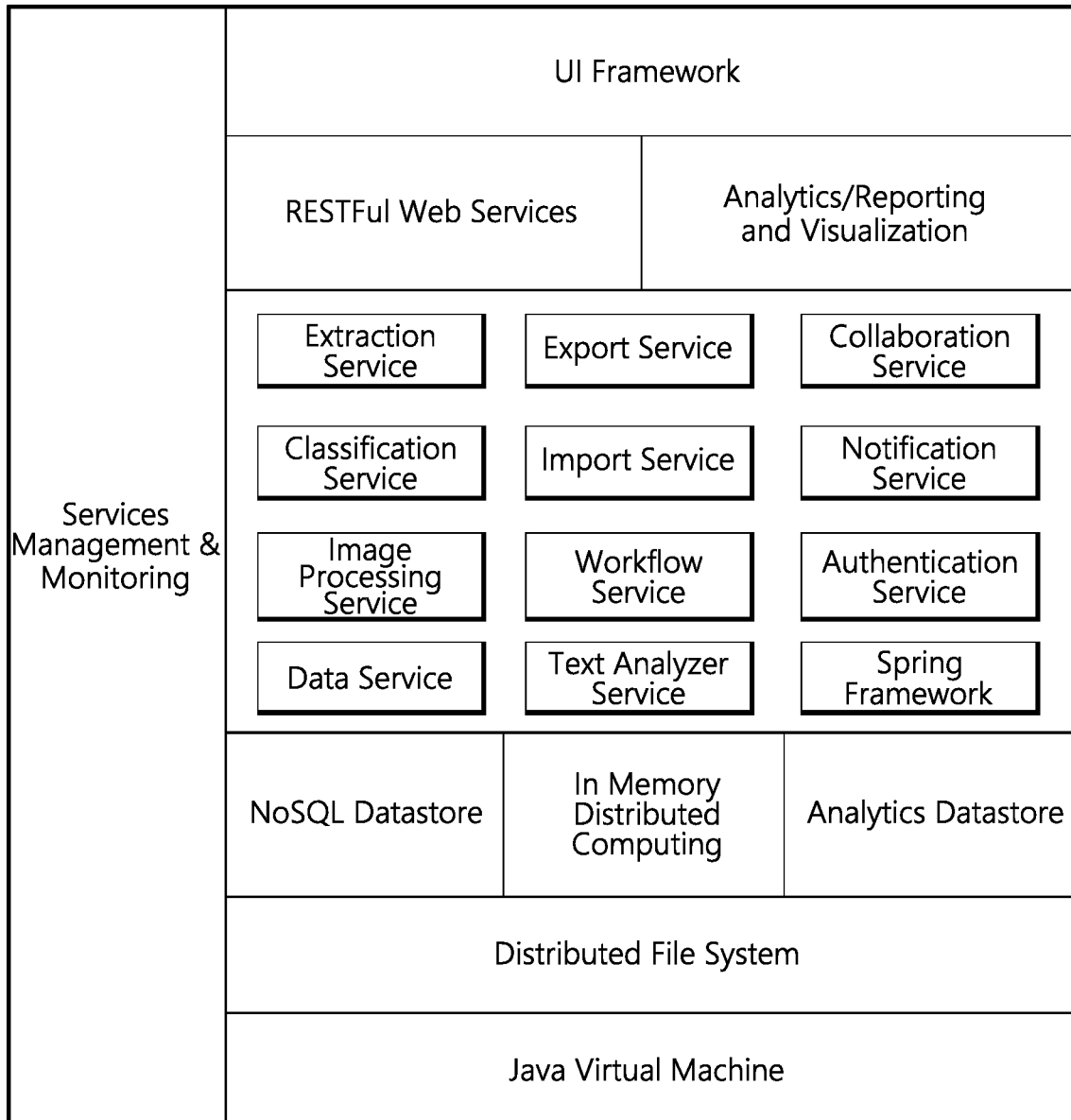
FIG. 7 illustrates an example system technology stack according to at least one embodiment.

FIG. 6 illustrates an example system architecture according to at least one embodiment. FIG. 7 illustrates an example system technology stack according to at least one embodiment.

Figure 8:
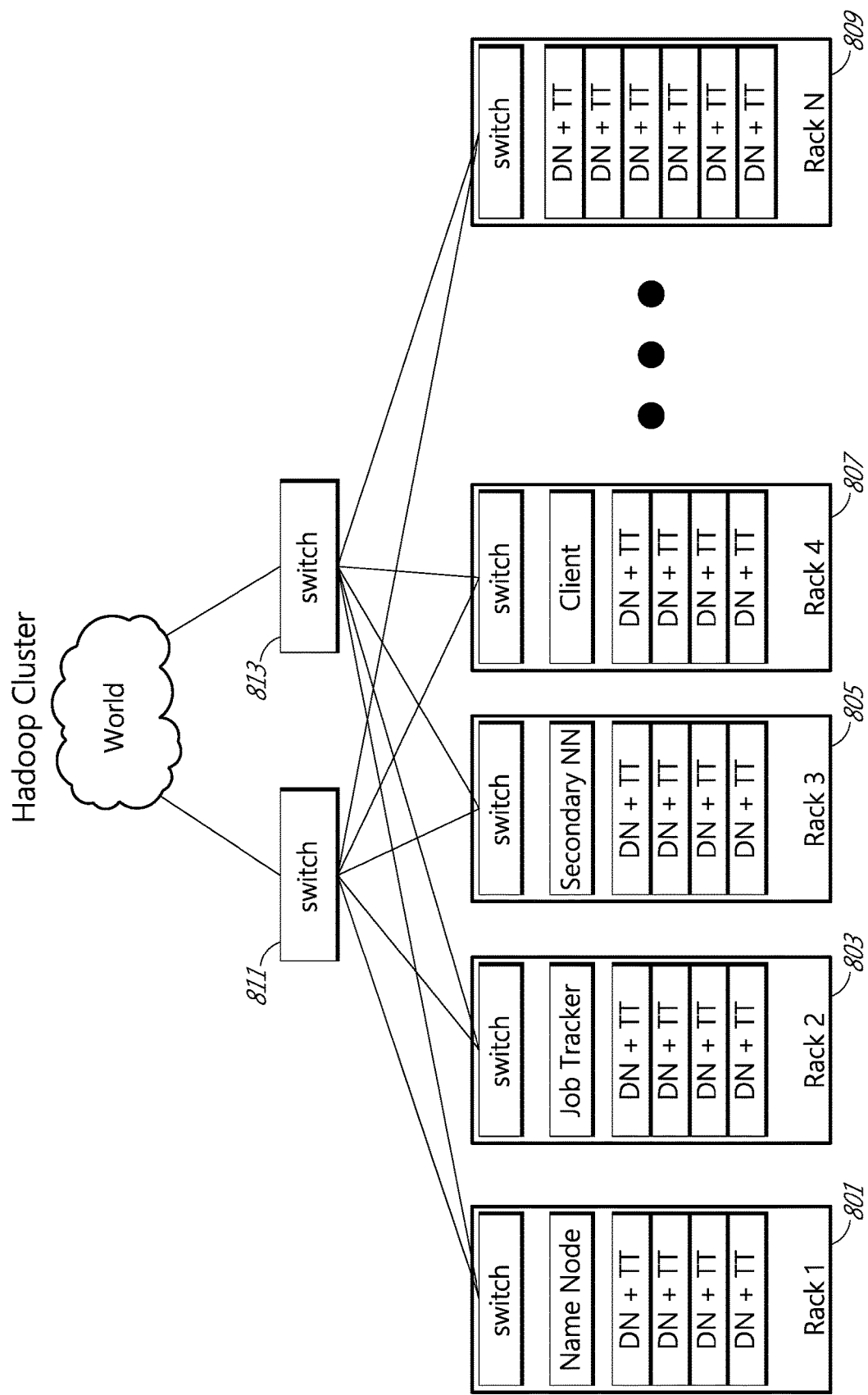
FIG. 8 illustrates an example Apache™ Hadoop® cluster according to at least one embodiment.

The techniques described herein are implemented through special processing capabilities on the back-end. The system can be built on an Apache™ Hadoop® platform. The Hadoop® platform is advantageous because it enables multiple off-the-shelf PCs to be connected, such that they perform like a single supercomputer, providing powerful CPU functionality at a lower cost than a supercomputer. An example Hadoop® cluster is shown in FIG. 8. The cluster includes rack servers populated in racks (Rack 1, Rack 2, Rack 3, Rack 4, and Rack N) each connected to a top of rack switch 801, 803, 805, 807, 809, usually with 1 or 2 GE boned links. The rack switches 801, 803, 805, 807, 809 have uplinks connected to another tier of switches 811, 813 connecting all the other racks with uniform bandwidth, forming the cluster. The majority of the servers will be Slave nodes with local disk storage and moderate amounts of CPU and DRAM. Some of the machines will be Master nodes that might have a slightly different configuration favoring more DRAM and CPU, and less local storage.

The Hadoop® platform is desirable not only for handling the large volumes of documents that the system is contemplated to process, but also for powering the recognition algorithms described above. It should be understood, however, that although embodiments disclosed herein use the Hadoop® framework as a representative example, embodiments are not limited to the Hadoop® framework. Rather, it is broadly contemplated that embodiments can be extended to all types of distributed file systems, known or unknown.

The system can additionally leverage the Apache™ Spark™ platform, an open source technology that accelerates data processing by loading data into memory instead of writing from the clustered servers' disks in the Hadoop® distributed file system (the approach used by MapReduce, the primary processing engine used by Hadoop®). The efficiency of the Spark™ framework comes from optimizing processing jobs by writing output to resilient distributed data sets (RDDs). The system disclosed herein takes the clustered computing of the Spark™ framework and uses it to run MLlib, the Spark™ platform's scalable machine learning library, to perform iterative computations that produce more accurate results while enabling the disclosed system to process document volumes at a pace almost 100 times faster than those observed with MapReduce. It was discovered that the combination of high volume and velocity allows the disclosed system to identify content faster and more accurately.

One or more databases may be used or referred to by one or more embodiments of the invention. It should be understood that such databases may be arranged in a wide variety of architectures and using a wide variety of data access and manipulation means. For example, in various embodiments, one or more databases may comprise a relational database system using a structured query language (SQL), while others may comprise an alternative data storage technology such as those referred to in the art as "NoSQL." A NoSQL database provides a mechanism for storage and retrieval of data that is modeled in means other than the tabular relations used in relational databases. A MongoDB (NoSQL-type) database (MongoDB Inc., New York City, N.Y.) was discovered to be particularly advantageous for the disclosed system, owing to its simplicity and feasibility for this application. MongoDB is characterized by a number of potential advantages, including scalability, open source architecture, NoSQL database structure, document-oriented storage (JSON-Style document storage), quick retrieval of data, easy replication, rich queries, fly indexes which can be created with a single command and cool data structure available with realm of key-value.

It should be understood, however, that variant database architectures such as column-oriented databases, in-memory databases, clustered databases, distributed databases, or even flat file data repositories may be used. It may be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

The disclosed system is designed to work with RestFUL APIs that make integration into third-party document stores and repositories fairly straightforward. RestFUL is an example of an Elasticsearch database (Elasticsearch BV, Amsterdam, Netherlands) which can be incorporated in certain embodiments. An Elasticsearch database allows for searching across all the data, all the columns and rows, and provides fast access to desired data. This integration, along with the Hadoop® platform, can be set up ahead of time with the help of a trained services team. After that, executing the system is in the hands of end-users, such as business analysts, that do not have specialized training.

Document Preparation And Analytics

Figure 9:
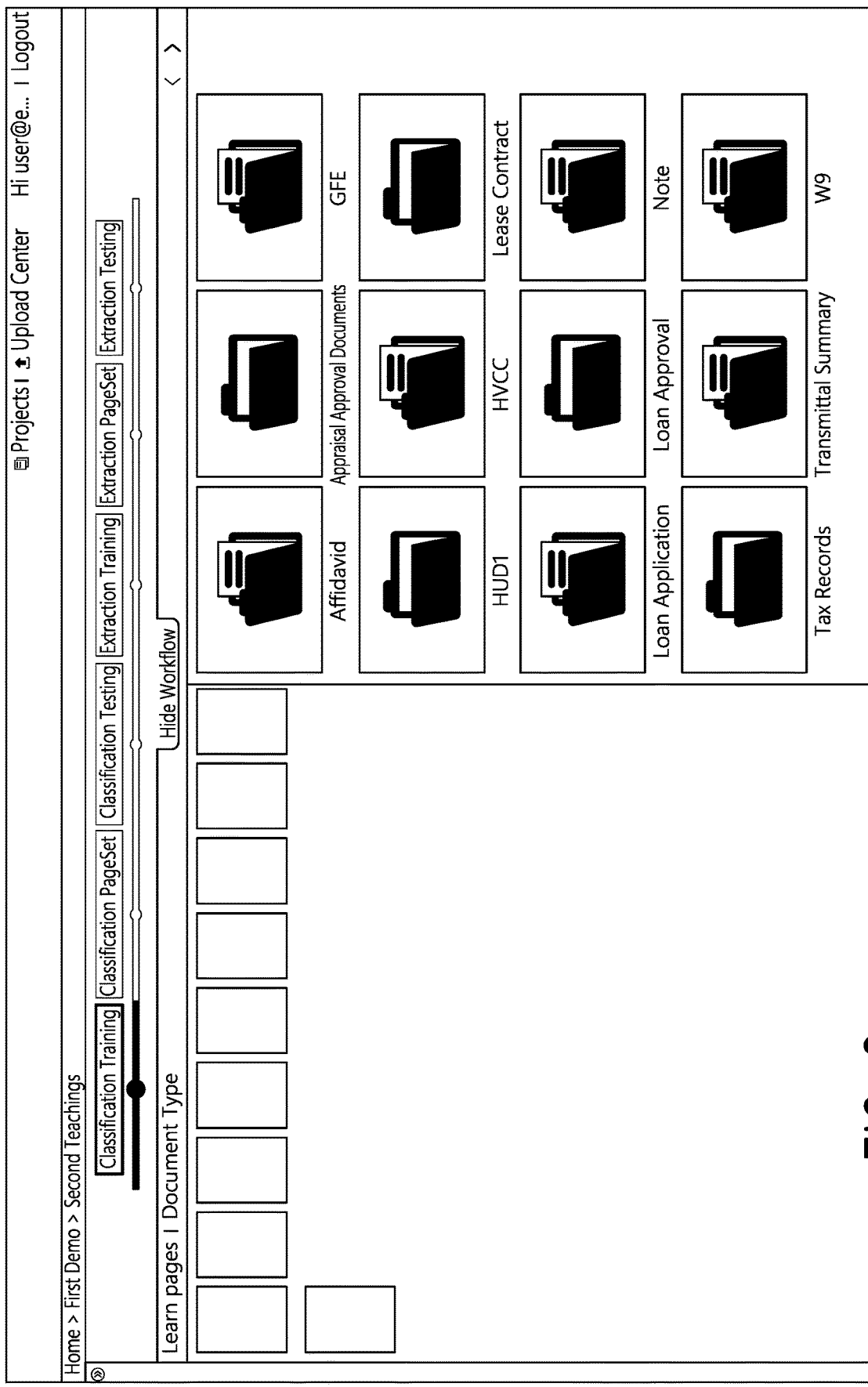
FIG. 9 illustrates an example classification training user interface screen according to at least one embodiment.
Figure 10:
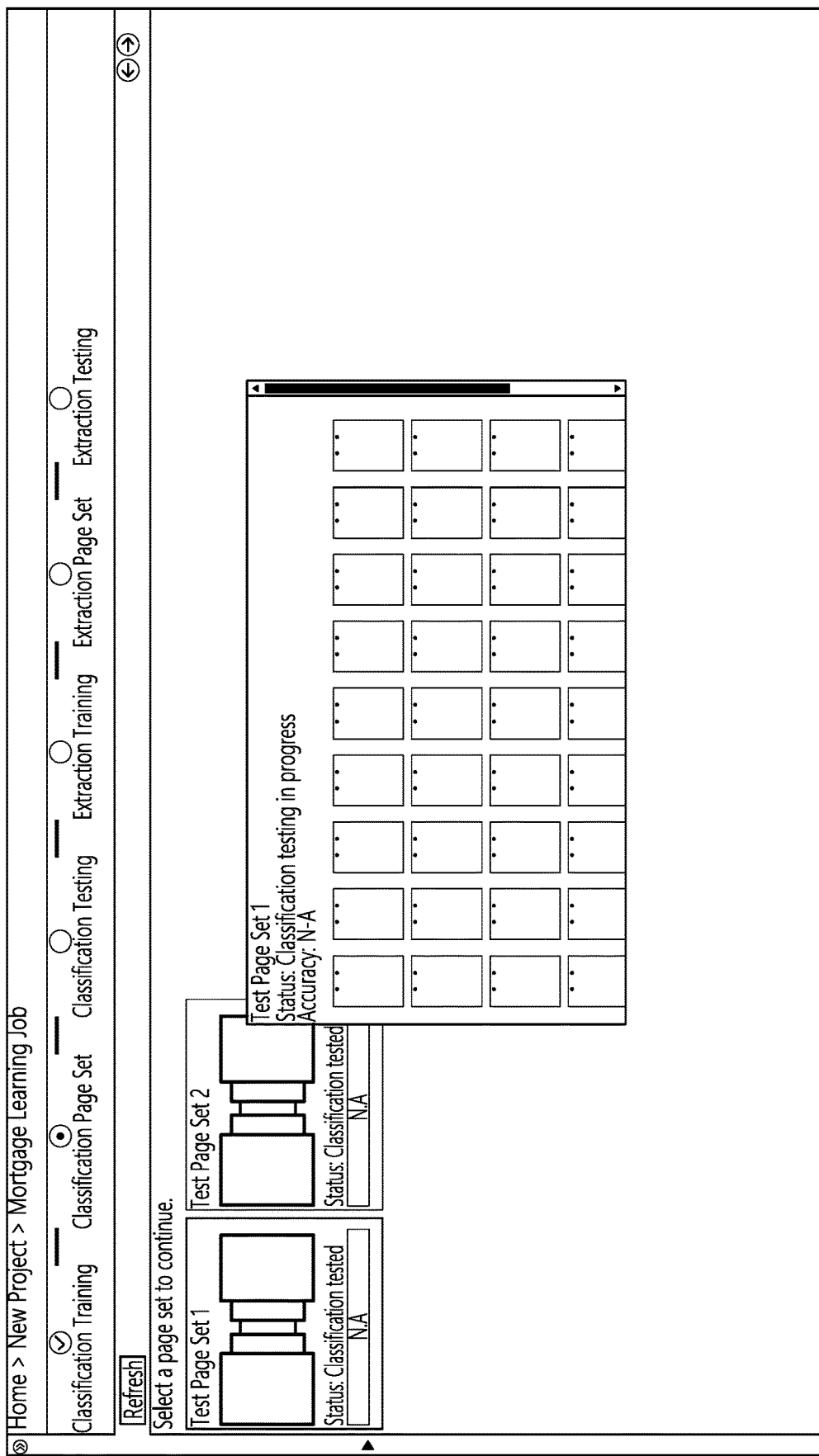
FIG. 10 illustrates an example classification page set user interface screen according to at least one embodiment.

At least one embodiment comprises a user interface, such as a multi-step user interface. For example, the system can comprise a six step user interface for interacting with the user to gather user feedback. In general, the first three interface screens (FIGS. 9, 10, and 11) are for classification of documents in preparation for data extraction. The last three screens (FIGS. 12, 13, and 14) are implemented to acquire user feedback on fields to be extracted.

The disclosed system can classify multiple document types in preparation for data extraction. Multiple data characteristics for each document can be extracted and available for analytics. The system, for example, understands that "Shell," when used in context with the terms "oil" or "gasoline," is referring to the energy corporation and not to the beach. These algorithms make document classification and data extraction simple and straightforward for the end-user.

Figure 11:
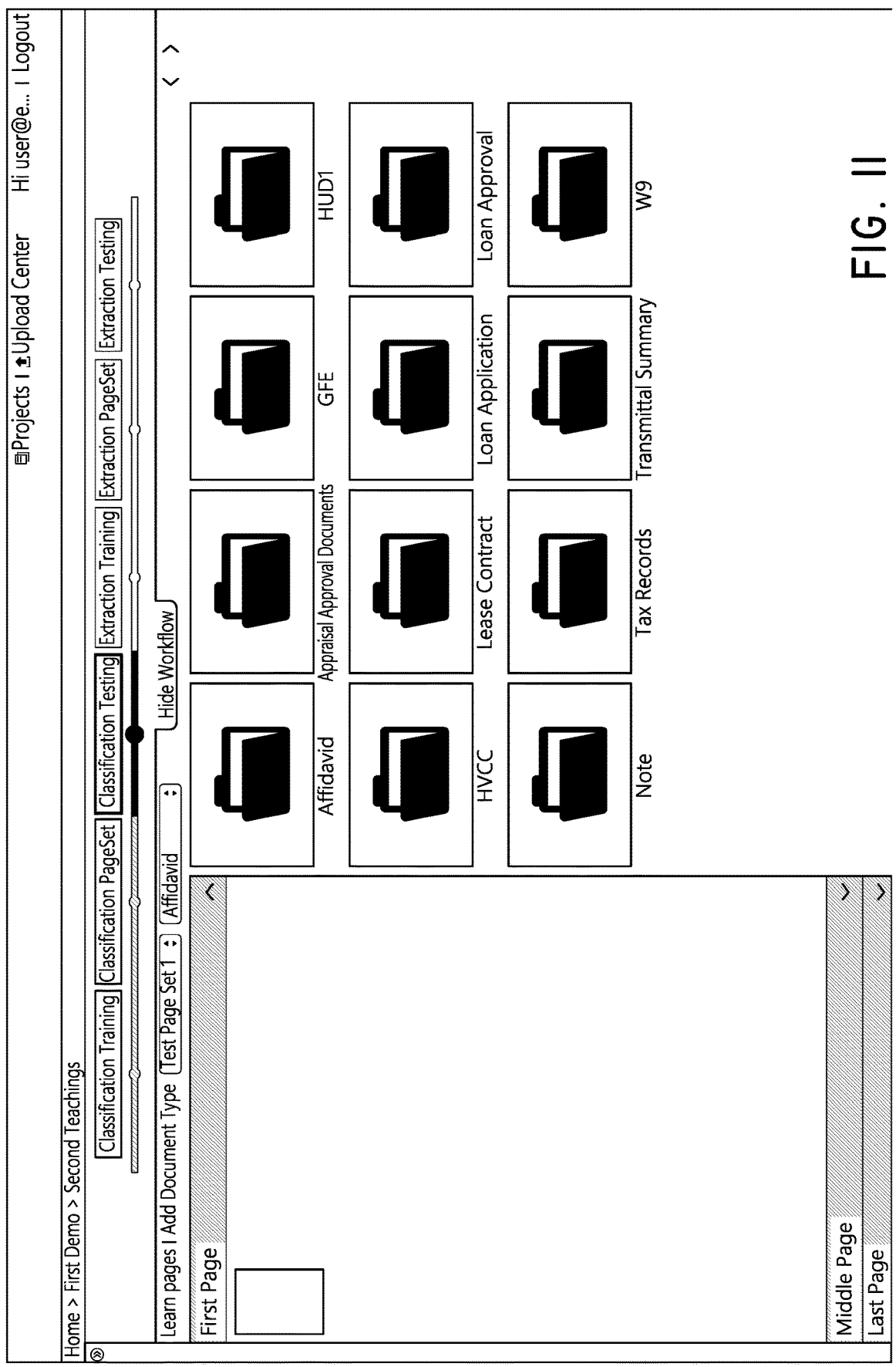
FIG. 11 illustrates an example classification testing user interface screen according to at least one embodiment.

FIG. 11 shows a user what the system did with the initial knowledge. With this interface, the user can provide feedback by dragging and dropping files to different categories. This feedback improves the algorithm with every new classification.

Figure 12:
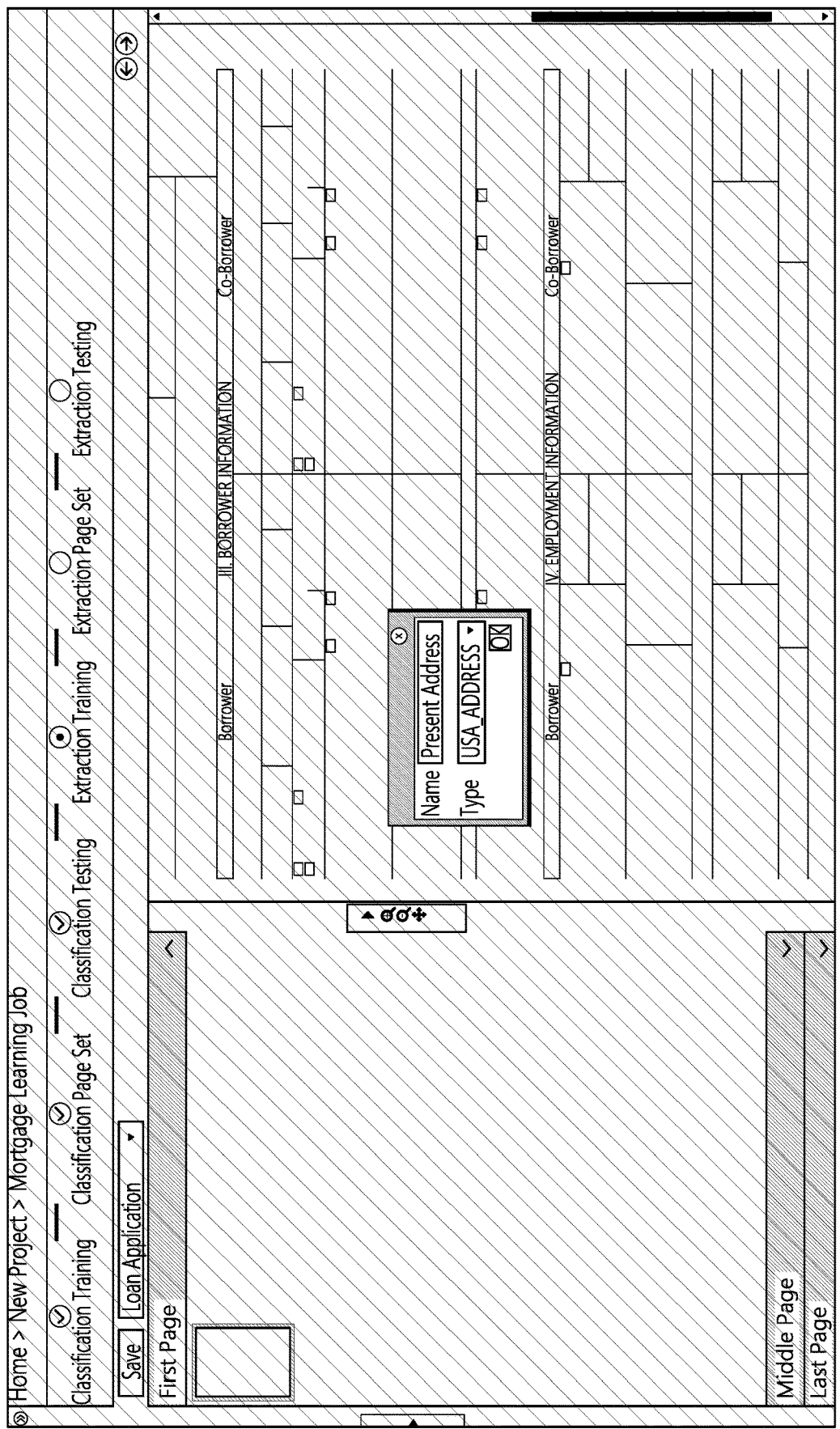
FIGS. 12 and 13 illustrate an example extractor training user interface screen according to at least one embodiment.
Figure 13:
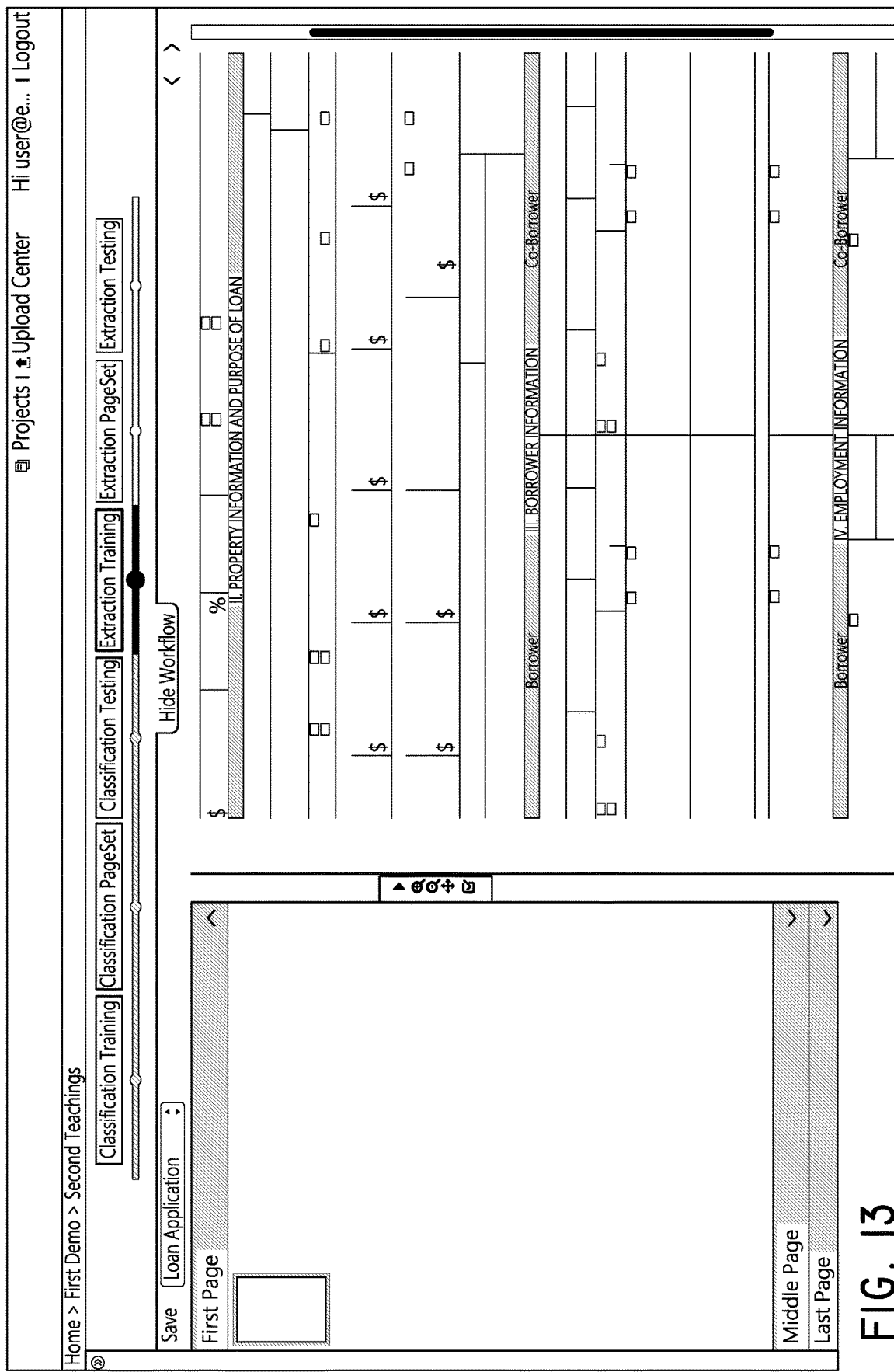
Figure 14:
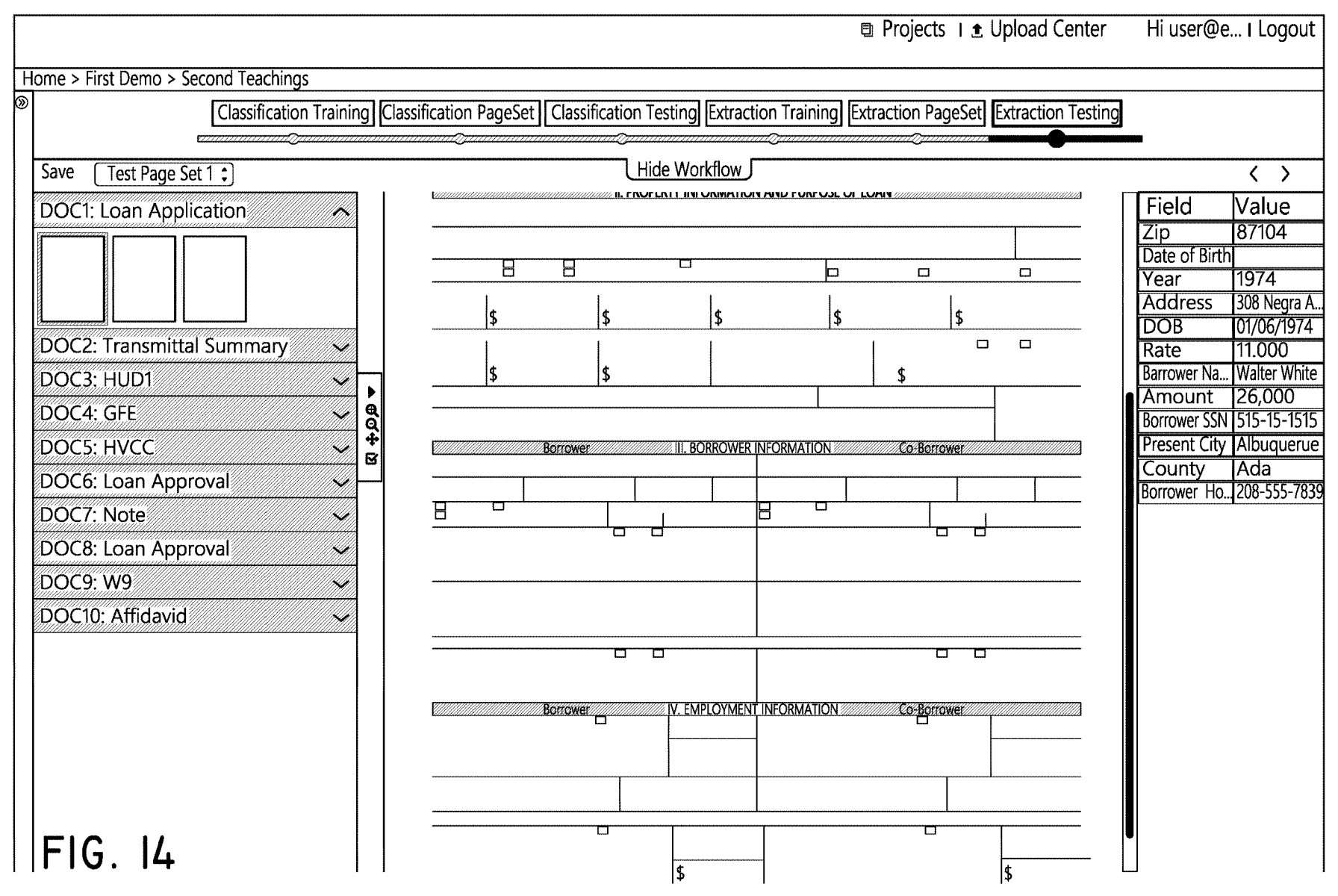

In FIG. 12, the user labels what is important for the system to capture. During this process, the user picks something to be extracted. For example, the user could define a loan amount as important information. The user clicks around various pages of a document or compilation and labels fields relevant to the loan amount. Multiple data characteristics from each document can be selected and made available for eventual extraction and analytics. FIG. 13 illustrates how a page will appear after a page has been set up by a user, with the fields to be captured being highlighted on the document. In the interface of FIG. 14, the system asks the user to give feedback on what the system extracted with the initial knowledge. As the user gives more feedback on the screens, the system readjusts and fine-tunes its algorithms, features, and the importance of those features.

After the system has been trained, the system will process all relevant documents, potentially millions of documents, to identify the learned field. The user has to train the system that a particular field is important; otherwise the system will not necessarily recognize that field as important. In the event the user does not properly define a field, the user will have to go back and set it up and reprocess. It is important to note, however, that while the system must be trained to learn to identify important information, only a small training set is required in order to do so.

Figure 20:
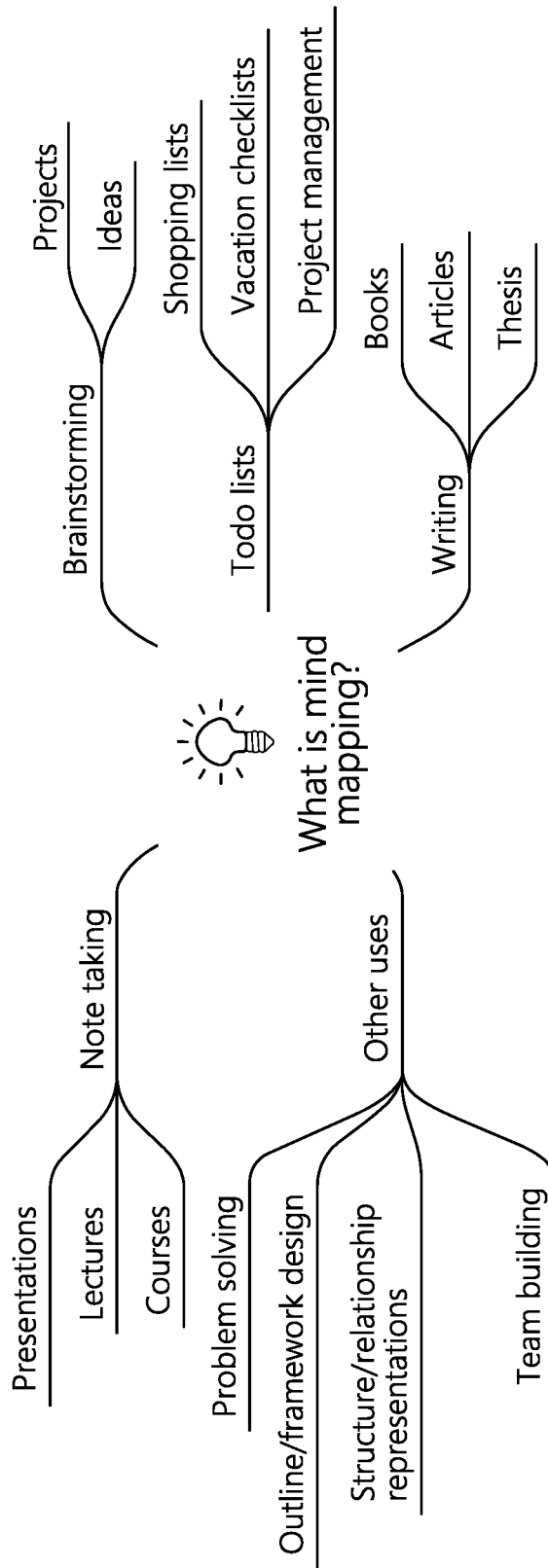
FIGS. 20 and 21 respectively illustrate uses for mind map displays and an example mind map display for change management.
Figure 21:
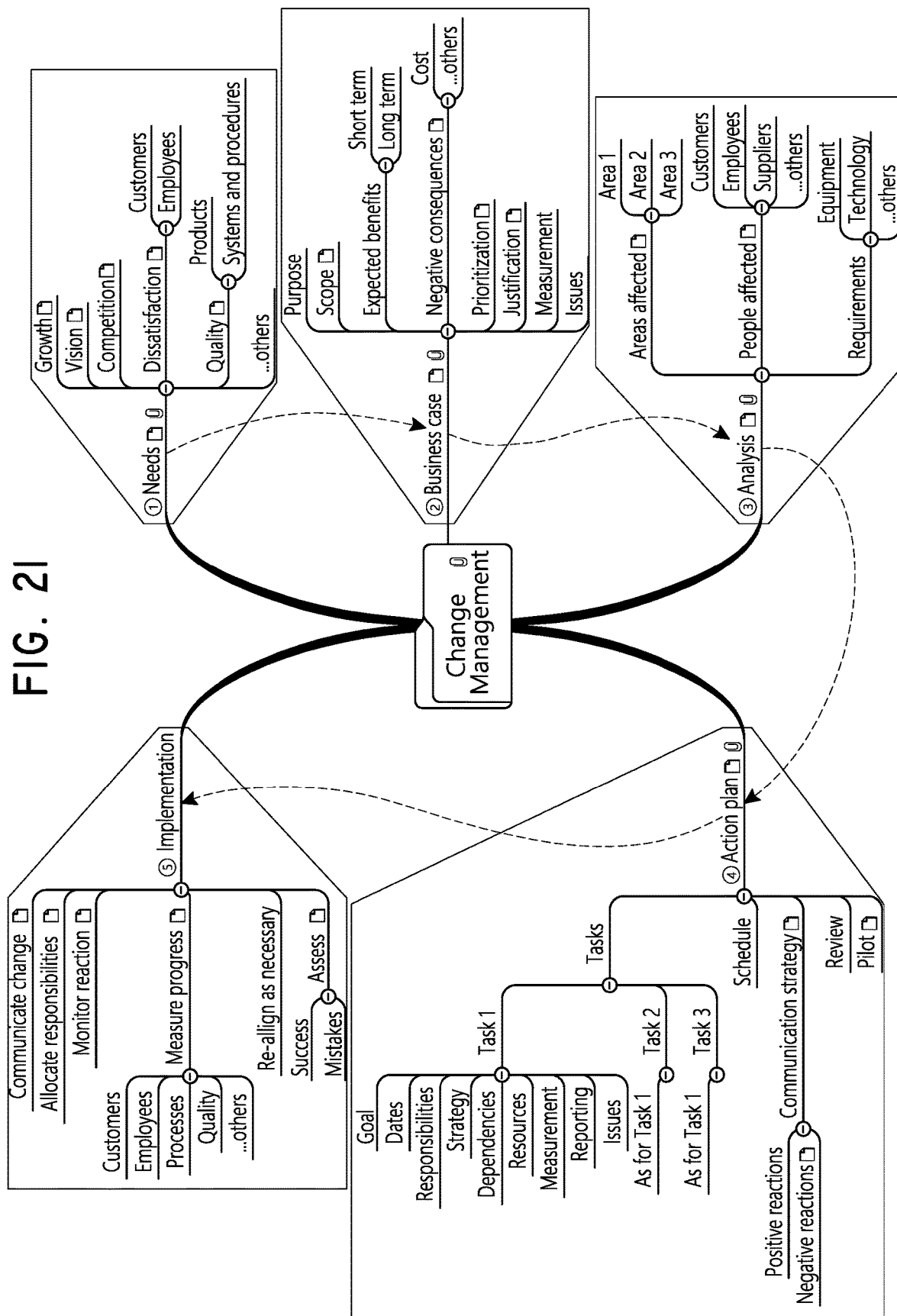

In various embodiments, the system can include a user interface for displaying information resembling the form of a mind map to a user and a control circuit that controls the displayed content of the mind map. As used herein, a mind map refers to a diagram used to represent words, ideas, tasks, or other items linked to and arranged radially around a central key word or idea. As shown in FIGS. 20 and 21, such mind maps can be used to generate, visualize, structure, and classify ideas, and as an aid in study, organization, problem solving, decision making, and writing. The elements of a given mind map are arranged intuitively according to the importance of the concepts, and are classified into groupings, branches, or areas, with the goal of representing semantic or other connections between portions of information. In was inventively recognized that, by presenting ideas in a non-linear manner, mind maps encourage a brainstorming approach to planning and organizational tasks. Though the branches of a mind map represent hierarchical tree structures, their radial arrangement disrupts the prioritizing of concepts typically associated with hierarchies presented with more linear visual cues. The disclosed techniques of data extraction and association build on the use of mind maps to facilitate display of important information.

Thus, according to at least one aspect of the disclosure, the system includes a browsing tool with modified mind map functionality. A user can, for example, choose to analyze five (or any number of) documents. From these five documents, the user can extract names, SSNs, and ZIP codes. The user interface would display these labels. The user could click on the label SSN shown on the user interface, and all identified SSNs (for example, matching the structure but not necessarily the exact number of a pre-determined SSN) would be displayed. It should be understood that such SSNs were identified using the algorithms described herein. The user could then click on a specific SSN from the displayed identified SSNs. The user interface would then show a mind map view of all connected fields. For example, if someone used two different names using the same SSN, the user could easily see the discrepancy. A mind map style display is particularly advantageous because one field, in this example SSN, can be connected to all other fields extracted from it.

Continuing this example, SSN is in the center and all connected information is around it like a mind map. But when the user clicks on a connected field, in this example name, or a connected document, the user interface would change and put the name in the center and started to show all connected fields and documents this information is coming from. In other words, the center of the mind map changes based on the selected data. Because the center of the mind map and fields that are connected to it will constantly be changing as the user clicks on them, the user interface will always show the datum in the middle and connected data around it. For this reason, the functionality of this user is significantly different from currently existing mind maps. Everything the user clicks will be centered and connected data will be automatically readjusted. Although the user interface may resemble a mind map when first opened, the way the user interface operates and organizes data is specifically related to data captured from documents.

Such mind map functionality can be useful, for example, in fraud investigation and missing document identification, among other things. In fraud investigation, an investigator can easily find and visualize when the same SSN or address is being fraudulently used in other documents across millions of documents. In missing document identification, a user can find a page or document misfiled with wrong document or folder. With a user interface with mind map functionality, the user could quickly explore documents from the data extracted. Stated another ways, the user can find documents based on data, rather than data based on documents.

Thus, in certain embodiments, an electronic device comprises a display for displaying contender values that have been positively associated with a pre-defined value from a compilation of one or more electronically stored documents in the form of a mind map to a user. The electronic device can further display a control circuit that controls the displayed content of the mind map, the control circuit configured to: receive a starting field input from the user and associate the starting field input with a center of the mind map, analyze the starting field input to establish branches of additional data from fields connected with the starting field input, receive a selection from the additional data and re-associate the selected additional data with the center of the mind map.

And in certain embodiments, an electronic device comprises a display for displaying contender values that have been positively associated with a pre-defined value from a compilation of one or more electronically stored documents in the form of a mind map to a user. The electronic device can further display a control circuit that controls the displayed content of the mind map, the control circuit configured to: receive a starting field input from the user and associate the starting field input with a center of the mind map, analyze the starting field input to establish branches of documents from fields connected with the starting field input, receive a selection from the documents, and display the selected document.

It should be understood that such embodiments and user interfaces for displaying positively associated contender values can be incorporated into any other embodiments described herein.

Machine Learning

In at least one embodiment, the system uses machine learning techniques to positively associate contender values with a pre-defined value. Machine learning comprises at least two phases: training and evaluation.

During the training phase, a corpus of training data is used to derive a model. The corpus comprises one or more vectors and a disposition relating to a contender value. It is important to note that any single vector might not yield any conclusive evidence over whether a contender value is positively associated with a pre-defined value, but examining a plurality of such vectors could provide conclusive evidence. Thus, it is desirable that the model include data for a plurality of the above-described vectors.

It is desirable for the data inputted to the machine learning to be representative of the real world scenarios in which the machine learning techniques will ultimately be applied. Thus, as discussed above, the data used to derive the model can be taken directly from actual compilations.

The model also takes as input a disposition determined by a human analyst that can positively associate contender value with a pre-defined value. The human analyst reviews the vectors, makes a determination regarding the contender value, and enters the disposition into the machine learning algorithm along with the vectors. It is desirable to have fewer unknown samples, though at the same time is understood in the art that conclusively resolved contender value dispositions can be difficult and expensive to obtain.

Next, a machine learning method is applied to the corpus. The methods by which training can be done include, but are not limited to Support Vector Machines, Neural Networks, Decision Trees, Naïve Bayes, Logistic Regression, and other techniques from supervised, semi-supervised, and unsupervised training. The training or "model-derivation" may be practiced with any of the above techniques so long as they can yield a method for associating contender values with a pre-defined value. The corpus need not be analyzed in one batch. Machine learning can be refined over time by inputting additional vectors and associated dispositions. Suitable program instructions stored on a non-transitory computer readable storage medium are executed by a computer processor in order to cause the computing system of to store the resulting model to a server or other appropriate storage location.

Once the training is sufficient and a model is derived, the model can be used to automatically evaluate new instances of contender values that are presented to the computer or computer network in practice. In this regard, there is a second evaluation phase, wherein the model is applied to the vectors to determine whether a contender values is likely associated with a pre-defined value. The server can output a disposition based on the model. The output can be a binary classification (associated or not associated). Advantageously, however, the output is a score that represents the likelihood of or confidence in this distinction, such as a score from 0 to 1 where 0 represents an overwhelming likelihood that the contender value is not associated with the pre-defined value and 1 represents an overwhelming likelihood that the contender value is associated with the pre-defined value. As another example, the output might be an encoding of the form ("associated", 0.95) which can be taken to mean that the model believes that a contender value has a 95% chance of being associated with the pre-defined value.

Multi-User Environment

In at least one embodiment, the system allows each user in an organization to look at the same repository or repositories or the same compilation or compilations but come to different conclusions about the data therein. For example, an employee in a company's marketing department can look at a compilation from a marketing perspective, utilize the system to process years of mortgage applications, and with the results, devise new marketing promotions that will address the company's consumers. But an employee in the same company's fraud department might want to look at the same documents to find fraud. The system allows every distinct user to mine the same set of documents differently.

As an example, an analyst at a mortgage lender may be given the task of preparing a report to help reduce the risk of loans being issued. The mortgage company may have millions of loans on file that could provide valuable data for this task, but with each loan file containing several hundred pages, annually examining them would be out of the question. The analyst's first task may be determining which files contain loans that are in default, indicated when the file contains some sort of default notice. Providing the system with a few samples of these notices would enable it to go through and locate which files contain similar notices. Once this has been accomplished, the analyst can separate the loan files into good and defaulted and begin minding them for data and looking for trends. Data that might be helpful could include the average income of the person or persons the loans were issued to, the number of people in the household, the assessed value of the properties, the geographic region of the property, the year a house was built, and so forth. Assuming this information is contained somewhere in the hundreds of pages associated with a loan file and the analyst thinks it might be useful, the disclosed system can find it and extract it.

To find average income data, for example, the analyst could submit some samples of W-2s, 1099s, and other tax forms to the disclosed system, which can then identify similar forms. On each sample, the analyst could also highlight the field where the income total is located, and the disclosed system can locate the totals in a high percentage of the tax forms within the loan files.

The disclosed system typically requires only a small amount of samples before it can start classifying documents and extracting data. The process of submitting the samples, running the classifier, highlighting the desired fields, and running the extractor typically takes only a few minutes due to the intuitive interface and desirable processing power of the Hadoop® platform.

Figure 15:
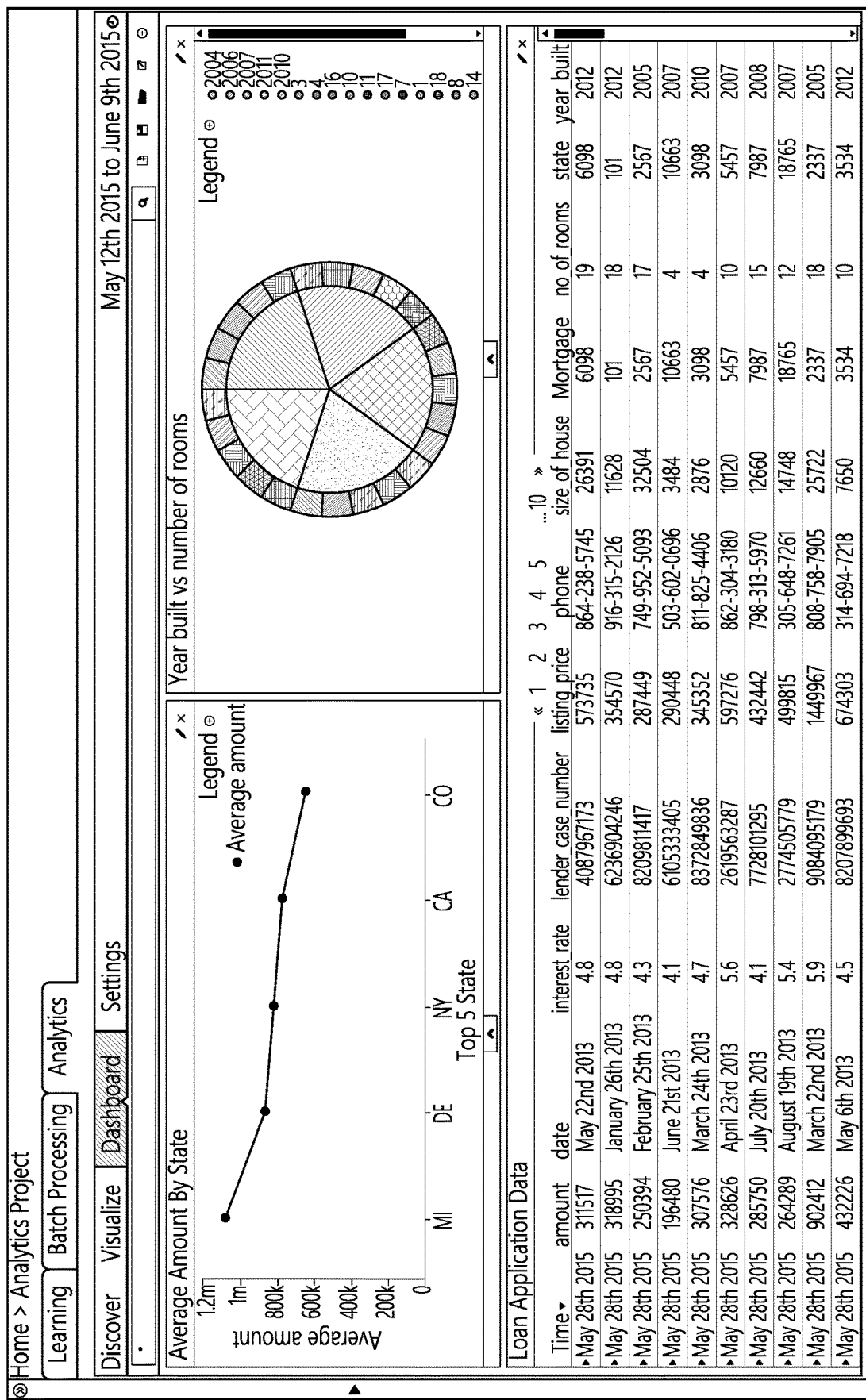
Figure 16:
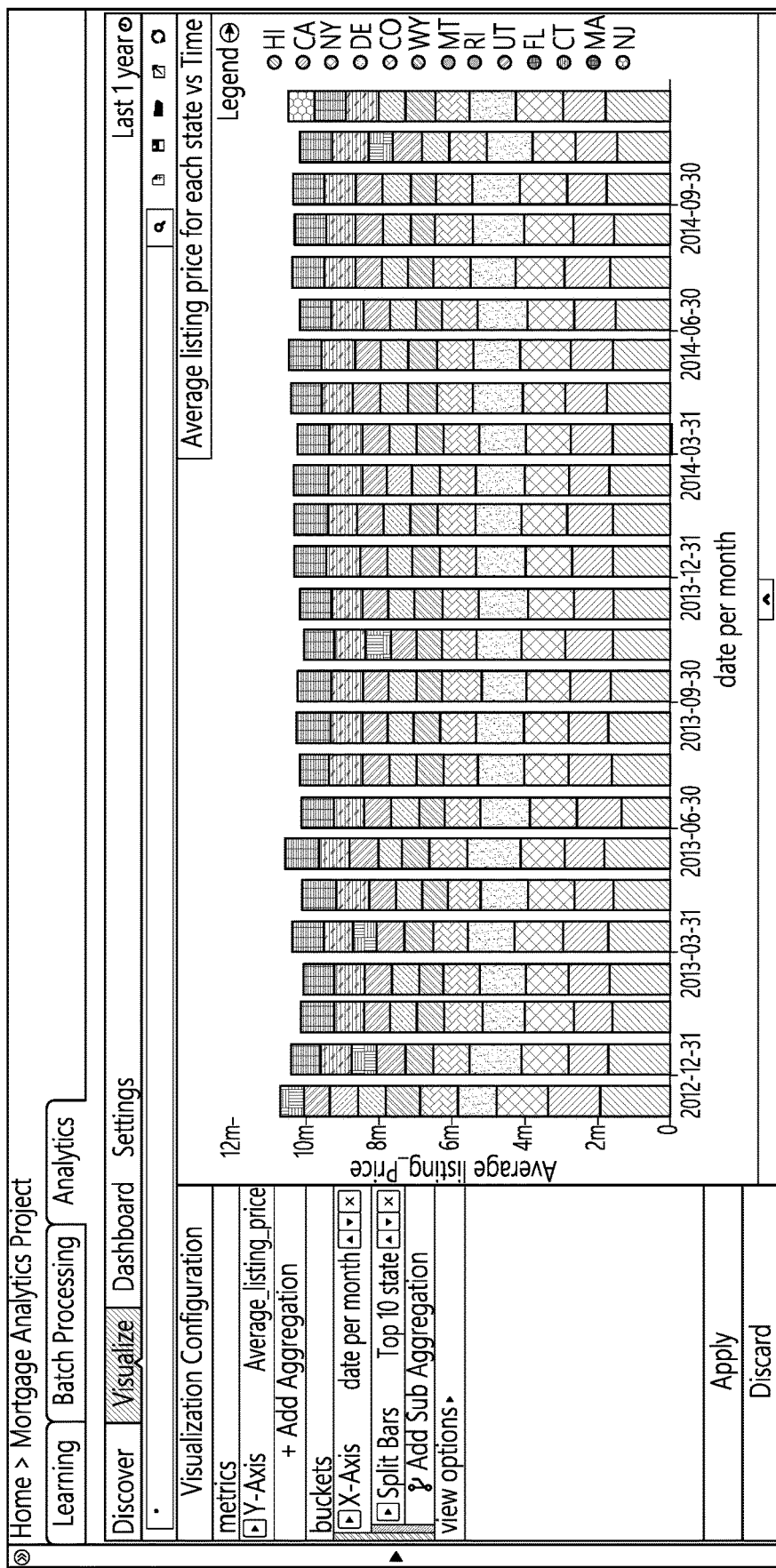
Figure 17:
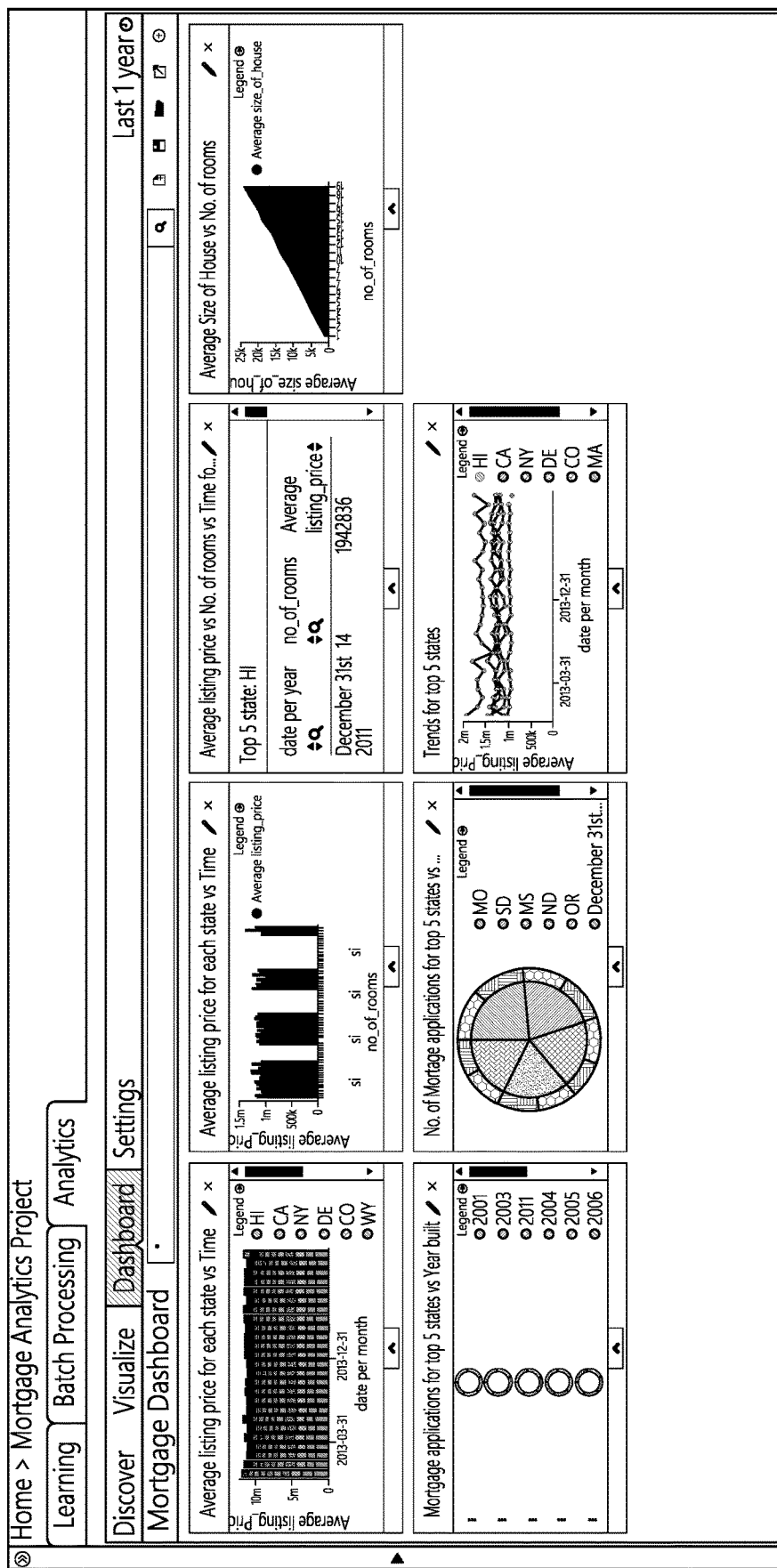

After the desired data is extracted, it is output into an analytics tool that is optionally included in certain embodiments of the disclosed system. In the mortgage loan example, the data could be used to produce two tables, one for defaulted loans and one for good loans. Each table could contain a column for each loan and a row for each piece of data. These data sets can also be used to produce graphs. A graph could help the analyst determine where the greatest and least risk lies in issuing a mortgage loan related to factors like income, value of the property, number of people in the household, and so forth. Other data visualizations are shown in FIGS. 15-19. FIG. 15 illustrates that data points from millions of document sets can be incorporated in reports that can be easily visualized. FIG. 16 shows that data visualizations can be configured to graphically represent changing market conditions in geographical and time-period context. FIG. 17 shows that multiple visualizations can be combined on a single dashboard user interface.

Figure 18:
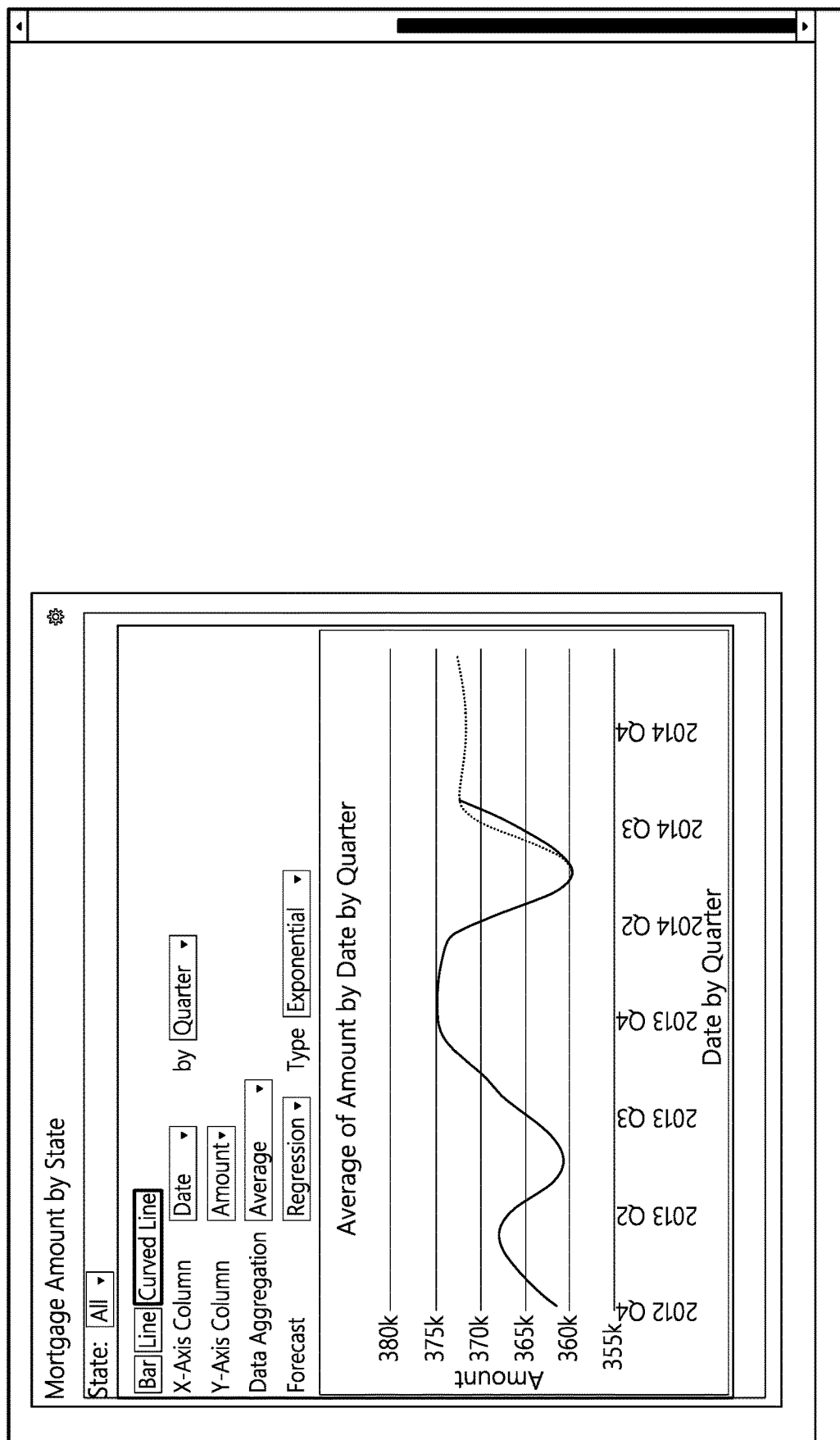
Figure 19:
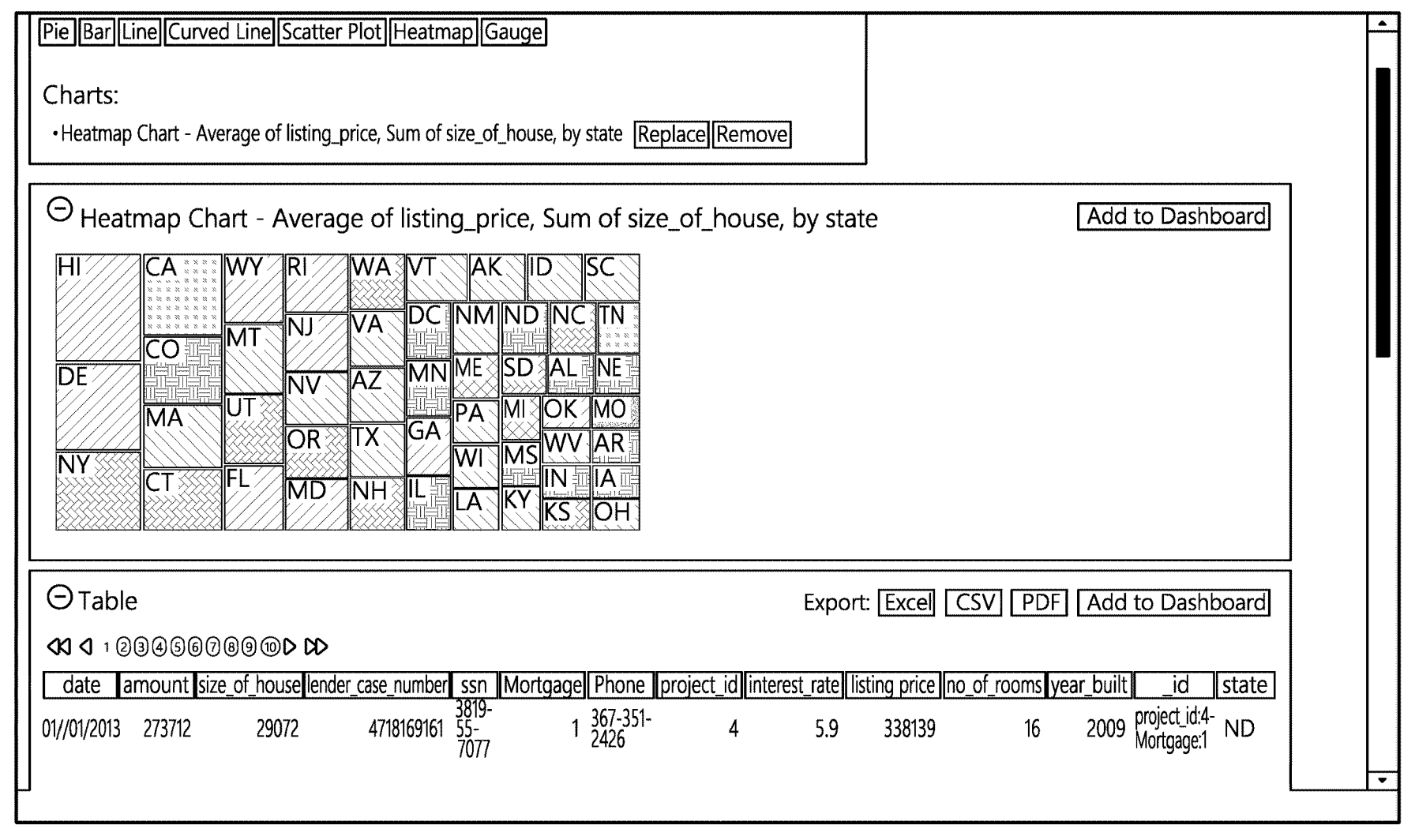

The tools also enable the analyst to make projections about the future, based on past results. For example, if the analyst wants to project the effect an upcoming plant closing in a large city will have on mortgage defaults, the analyst can examine results from the city were similar event occurred in the past. FIG. 18 shows that data can be graphed and modeled to create predictive forecasts. FIG. 19 shows another aspect of the analytics tool. As shown here, datasets can be represented in "heatmaps," allowing users to identify areas of interest or concern and drill down for more specific information.

Fraud prevention is another potential use case for the disclosed system. A security analyst could set up the system to find all Social Security numbers on loan applications and then look for any duplicates. If a particular ID number was used multiple times, it could alert the analyst to possible fraud. Another potential use case is searching across a company's expense reports and receipts to determine which vendors an organization is spending the most money with. This information could be used to negotiate better discounts. While organizations in industries like financial services, insurance, government, healthcare, energy, and transportation, where paper documents are an important part of transactions, are going to have a clear need for the disclosed system. It is contemplated that the system can also be valuable across industries from mining documents like HR forms, invoices, contracts, and other types of legal documents.

Additional Implementation Mechanisms

In general, the foregoing computing system can include one or more computer readable storage devices, one or more software modules including computer executable instructions, a network connection, and one or more hardware computer processors in communication with the one or more computer readable storage devices.

According to one embodiment, the techniques described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 22:
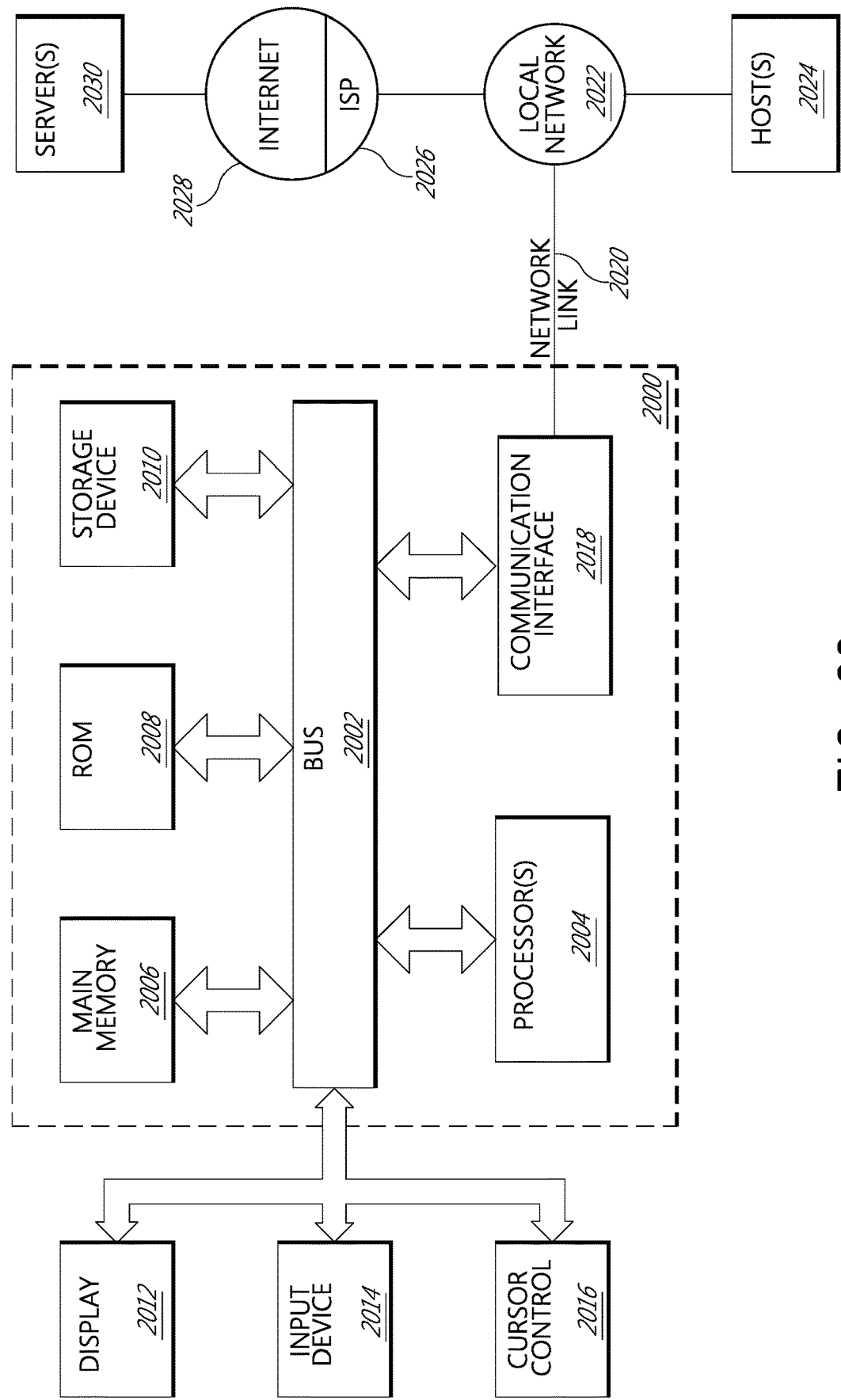
FIG. 22 illustrates a computer system with which certain methods discussed herein may be implemented.

For example, FIG. 22 illustrates a block diagram that illustrates a computer system 2000 upon which various embodiments can be implemented. For example, any of the computing devices discussed herein can include some or all of the components and/or functionality of the computer system 2000.

Computer system 2000 includes a bus 2002 or other communication mechanism for communicating information, and a hardware processor, or multiple processors, 2004 coupled with bus 2002 for processing information. Hardware processor(s) 2004 can be, for example, one or more general purpose microprocessors.

Computer system 2000 also includes a main memory 2006, such as a random access memory (RAM), cache and/or other dynamic storage devices, coupled to bus 2002 for storing information and instructions to be executed by processor 2004. Main memory 2006 also can be used for storing temporary variables or other intermediate information during execution of instructions to be executed by processor 2004. Such instructions, when stored in storage media accessible to processor 2004, render computer system 2000 into a special-purpose machine that is customized to perform the operations specified in the instructions. Main memory 2006 can also store cached data, such as zoom levels and maximum and minimum sensor values at each zoom level.

Computer system 2000 further includes a read only memory (ROM) 2008 or other static storage device coupled to bus 2002 for storing static information and instructions for processor 2004. A storage device 2010, such as a magnetic disk, optical disk, or USB thumb drive (Flash drive), etc., is provided and coupled to bus 2002 for storing information and instructions. For example, the storage device 2010 can store measurement data obtained from a plurality of sensors.

Computer system 2000 can be coupled via bus 2002 to a display 2012, such as a cathode ray tube (CRT) or LCD display (or touch screen), for displaying information to a computer user. For example, the display 2012 can be used to display any of the user interfaces described herein with respect to FIGS. 3A-3B. An input device 2014, including alphanumeric and other keys, is coupled to bus 2002 for communicating information and command selections to processor 2004. Another type of user input device is cursor control 416, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane. In some embodiments, the same direction information and command selections as cursor control can be implemented via receiving touches on a touch screen without a cursor.

Computing system 2000 can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage Computer system 2000 can implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor(s) 2004 executing one or more sequences of one or more instructions contained in main memory 2006. Such instructions can be read into main memory 2006 from another storage medium, such as storage device 2010. Execution of the sequences of instructions contained in main memory 2006 causes processor(s) 2004 to perform the process steps described herein. In alternative embodiments, hard-wired circuitry can be used in place of or in combination with software instructions.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device 2010. Volatile media includes dynamic memory, such as main memory 2006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but can be used in conjunction with transmission media. Transmission media participates in transferring information between non-transitory media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media can be involved in carrying one or more sequences of one or more instructions to processor 2004 for execution. For example, the instructions can initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 can retrieve and execute the instructions. The instructions received by main memory 2006 can optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 can be an integrated services digital network (ISDN) card, cable modem, satellite modem, or a modem to provide a data communication connection to a corresponding type of telephone line. As another example, communication interface 2018 can be a local area network (LAN) card to provide a data communication connection to a compatible LAN (or WAN component to communicated with a WAN). Wireless links can also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 can provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code can be executed by processor 2004 as it is received, and/or stored in storage device 2010, or other non-volatile storage for later execution.

Terminology

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and can possibly include such components as memory, input/output devices, and/or network interfaces, among others. The term "a" as used herein should also be given an inclusive rather than exclusive interpretation. For example, unless specifically noted, the term "a" should not be understood to mean "one" or "one and only one"; instead, the term "a" generally means "one or more" in open-ended claims or embodiments when used with language such as "comprising" or "including." Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
   one or more computer readable storage devices, at least one of the one or more computer readable storage devices configured to store a subject page that is unstructured or semi structured;
   one or more hardware computer processors in communication with the one or more computer readable storage devices, the one or more hardware computer processors configured to execute one or more software modules that include computer executable instructions, in order to cause the system to
      receive, from a user workstation, information associated with a pre-defined value defined by a user and a pre-selected page selected by the user, wherein the pre-selected page comprises a plurality of words and the pre-defined value has a known format and a known two-dimensional spatial relationship to the plurality of words in the pre-selected page, and wherein the pre-defined value is associated with one or more keywords,
      retrieve the subject page from the one or more computer readable storage devices,
      identify words and contender values on the subject page,
      group the identified words and the identified contender values on the subject page into a plurality of blocks based on their spatial positioning on the subject page, each block comprising one or more of the identified words, or one of the identified contender values, or a combination thereof; and
      for a subject contender value of the identified contender values,
         determine a first confidence that the subject contender value is associated with the pre-defined value based on a comparison of 1) a calculated two-dimensional spatial relationship between the subject contender value and at least some of the blocks on the subject page, and 2) the known two-dimensional spatial relationship between the pre-defined value and the plurality of words in the pre-selected page,
         determine a second confidence that the subject contender value is associated with the pre-defined value based on a comparison of 1) a subset of blocks on the subject page that are around the subject contender value, and 2) the one or more keywords associated with the pre-defined value, and
         determine at least one additional confidence that the subject contender value is associated with the pre-defined value;
      extract at least one probable contender value from the identified contender values as probably associated with the pre-defined value, based on the first confidence, the second confidence, and the at least one additional confidence; and
      return the at least one probable contender value to the one or more computer readable storage devices for storage therein.

2. The system of claim 1, wherein the one or more hardware computer processors are configured to execute the one or more software modules in order to cause the system to adjust the determination of the first confidence based on a count of the blocks on the subject page.

3. The system of claim 1, wherein the one or more hardware computer processors are configured to execute the one or more software modules in order to cause the system to group the identified words and the identified contender values into anchor blocks based on typographical characteristics of the identified words and the identified contender values, the typographical characteristics comprising font size, font face, or a combination thereof.

4. The system of claim 1, wherein the one or more hardware computer processors are configured to execute the one or more software modules in order to cause the system to determine the at least one additional confidence based at least in part on a comparison of a format of the subject contender value with the known format of the pre-defined value.

5. The system of claim 1, wherein the one or more hardware computer processors are configured to execute the one or more software modules in order to cause the system to determine the at least one additional confidence based at least in part on a position of the subject contender value on the subject page.

6. The system of claim 1, wherein the one or more hardware computer processors are configured to execute the one or more software modules in order to cause the system to determine the at least one additional confidence based at least in part on a compensation for typographical differences between at least some of the identified words in the blocks on the subject page and at least some of the words on the pre-selected page not exceeding a numerical threshold.

7. The system of claim 1, wherein the one or more hardware computer processors are configured to execute the one or more software modules in order to cause the system to determine the at least one additional confidence based at least in part on a compensation for root-stem associations between at least some of the words in the blocks on the subject page and at least some of the words on the pre-selected page.

8. The system of claim 1, wherein the one or more hardware computer processors are configured to execute the one or more software modules in order to cause the system to determine the at least one additional confidence based at least in part on relative positions of at least some of the words in the blocks on the subject page.

9. The system of claim 1, wherein the post-OCR processing is configured to identify the contender values based on formatting including numerical formatting, date formatting, delimiting character formatting, or a combination thereof.

10. The system of claim 1, wherein the known format of the pre-defined value comprises a location of the pre-defined value in a first zone on the pre-selected page, and wherein the one or more hardware computer processors are configured to execute the one or more software modules in order to cause the system to determine the at least one additional confidence based at least in part on whether the subject contender value is located in a second zone on the subject page that is related to the first zone on the pre-selected page.

11. The system of claim 1, wherein the one or more hardware computer processors are configured to execute the one or more software modules in order to cause the system to determine the at least one additional confidence based at least in part on a compensation for typographical differences between the subject contender value and the pre-defined value not exceeding a numerical threshold.

12. The system of claim 1, wherein the one or more hardware computer processors are configured to execute the one or more software modules in order to cause the system to determine the at least one additional confidence based at least in part on an evaluation of a position of the subject contender value within an associated block.

13. The system of claim 1, wherein the one or more hardware computer processors are configured to execute the one or more software modules in order to cause the system to determine the at least one additional confidence based at least in part on a comparison of the subject contender value with a compendium of values.

14. The system of claim 1, wherein the first confidence is associated with a first dimension, the second confidence is associated with a second dimension, and the at least one additional confidence is associated with a third dimension, and the one or more hardware computer processors are configured to execute the one or more software modules in order to cause the system further to adjust distinct weights assigned to each of the first dimension, the second dimension, and the third dimension based on the pre-defined value when extracting the at least one probable contender value.

15. The system of claim 1, wherein the one or more hardware computer processors are configured to execute the one or more software modules in order to cause the system further to, for a block associated with the subject contender value, representing a subject block,
assign a first block weight for the subject block,
assign a second block weight for a second block above the subject block,
assign a third block weight for a third block to the left of the subject block, and
assign a fourth block weight, lower than the first block weight, the second block weight, and the third block weight, to a remaining block, based on a two-dimensional spatial distance to the subject block.

16. The system of claim 15, wherein the second block is immediately adjacent to the subject block such that there are no blocks between the second block and the subject block in the vertical direction.

17. The system of claim 15, wherein the third block is immediately adjacent to the subject block such that there are no blocks between the third block and the subject block in the horizontal direction.

18. The system of claim 15, wherein the one or more hardware computer processors are configured to execute the one or more software modules in order to cause the system further to assign a lower fourth block weight when the fourth block is located to the right of the subject block than when the fourth block is located an equivalent two-dimensional spatial distance to the left of the subject block.

* * * * *